United States Patent [19]
Takahashi et al.

[11] Patent Number: 5,992,748
[45] Date of Patent: Nov. 30, 1999

[54] TWO-DIMENSIONAL COLOR CODE, PREPARING AND RESTORING METHOD FOR THE CODE AND APPARATUS THEREFOR

[75] Inventors: Junji Takahashi; Hiroyuki Ikeda, both of Ibaraki-ken, Japan

[73] Assignee: Riso Kagaku Corporation, Tokyo, Japan

[21] Appl. No.: 08/911,372

[22] Filed: Aug. 7, 1997

[30] Foreign Application Priority Data

Aug. 8, 1996 [JP] Japan ................................ 8-210001

[51] Int. Cl.$^6$ ........................................................ G06F 7/12
[52] U.S. Cl. ........................................ 235/465; 235/469
[58] Field of Search ...................................... 235/465, 469

[56] References Cited

U.S. PATENT DOCUMENTS

| | | | |
|---|---|---|---|
| 3,812,325 | 5/1974 | Schmidt | 235/494 |
| 5,426,289 | 6/1995 | Kinoshita et al. | 235/469 |
| 5,504,322 | 4/1996 | Pavlidis et al. | 235/494 |
| 5,523,552 | 6/1996 | Shellhammer et al. | 235/462 |
| 5,576,528 | 11/1996 | Chew et al. | 235/469 |
| 5,591,956 | 1/1997 | Longacre, Jr. et al. | 235/494 |
| 5,719,385 | 2/1998 | Wike, Jr. et al. | 235/467 |
| 5,726,435 | 3/1998 | Hara et al. | 235/462 |
| 5,869,828 | 2/1999 | Braginsky | 235/467 |

FOREIGN PATENT DOCUMENTS 054581   1/1990   European Pat. Off. ............... 235/494

OTHER PUBLICATIONS

Electronics and communications in Japan, Ohyama et al. Optical Sheet Memory System, Part 2, vol. 75, No. 4, Jan. 1992.

*Primary Examiner*—Donald Hajec
*Assistant Examiner*—Douglas X. Rodriguez
*Attorney, Agent, or Firm*—Kanesaka & Takeuchi

[57] ABSTRACT

An apparatus for preparing a two-dimensional color code includes a reading section for reading an original image object to output to processing device; processing means having a code conversion section to output two-dimensional color codes corresponding to gradations of shades of color separately of CMY colors in original image data of one pixel read; and a printing section for printing on a printing sheet. An apparatus for restoring a two-dimensional color code reads the two-dimensional color code at the reading section to output the gradations of shades of color separately of CMY colors. The printing section prints restored image data on a printing body on the basis of the gradations of shades of color.

22 Claims, 16 Drawing Sheets

| CODE CONVERSION TABLE | | C2 | | | | | | |
|---|---|---|---|---|---|---|---|---|
| | | WHITE | YELLOW | MAGENTA | RED | CYAN | GREEN | BLUE |
| C1 | WHITE | 0 | 7 | 14 | 21 | 28 | 35 | 42 |
| | YELLOW | 1 | 8 | 15 | 22 | 29 | 36 | 43 |
| | MAGENTA | 2 | 9 | 16 | 23 | 30 | 37 | 44 |
| | RED | 3 | 10 | 17 | 24 | 31 | 38 | 45 |
| | CYAN | 4 | 11 | 18 | 25 | 32 | 39 | 46 |
| | GREEN | 5 | 12 | 19 | 26 | 33 | 40 | 47 |
| | BLUE | 6 | 13 | 20 | 27 | 34 | 41 | 48 |

FIG. 1

|  C  |  M  |  Y  |
|-----|-----|-----|
| C1  | M1  | Y1  |
| C2  | M2  | Y2  |

FIG. 2

| CODE CONVERSION TABLE | | C2 | | | | | | |
|---|---|---|---|---|---|---|---|---|
| | | WHITE | YELLOW | MAGENTA | RED | CYAN | GREEN | BLUE |
| C1 | WHITE | 0 | 7 | 14 | 21 | 28 | 35 | 42 |
| | YELLOW | 1 | 8 | 15 | 22 | 29 | 36 | 43 |
| | MAGENTA | 2 | 9 | 16 | 23 | 30 | 37 | 44 |
| | RED | 3 | 10 | 17 | 24 | 31 | 38 | 45 |
| | CYAN | 4 | 11 | 18 | 25 | 32 | 39 | 46 |
| | GREEN | 5 | 12 | 19 | 26 | 33 | 40 | 47 |
| | BLUE | 6 | 13 | 20 | 27 | 34 | 41 | 48 |

F I G. 4(a)　　F I G. 4(b)
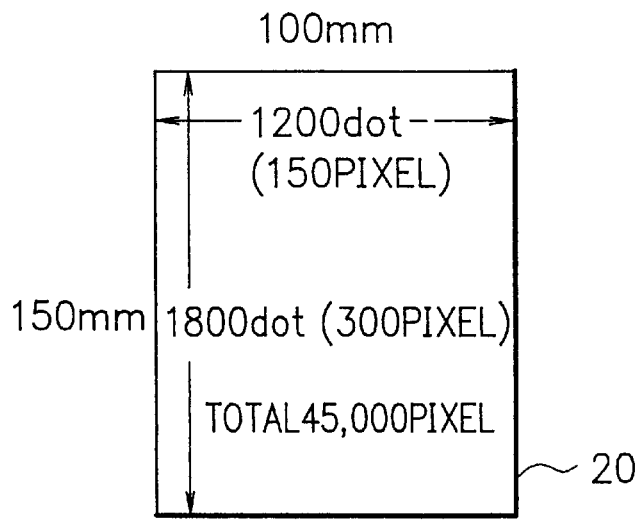
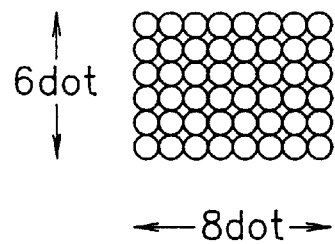
F I G. 5(a)　　F I G. 5(b)
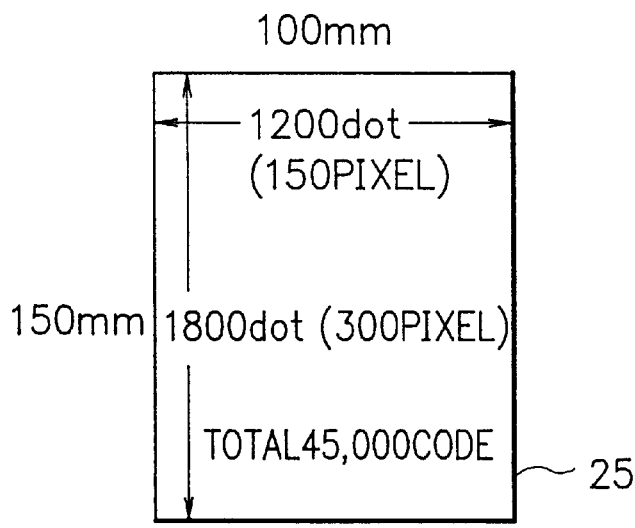
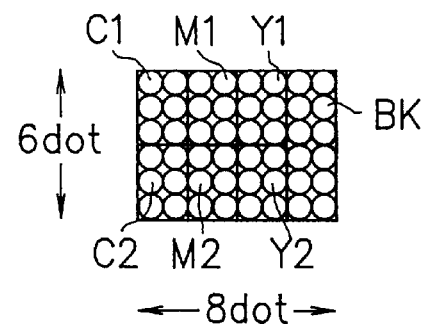

F I G. 14(a)
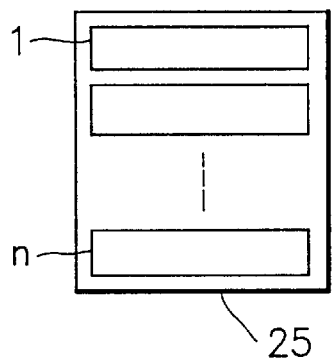
F I G. 14(b)
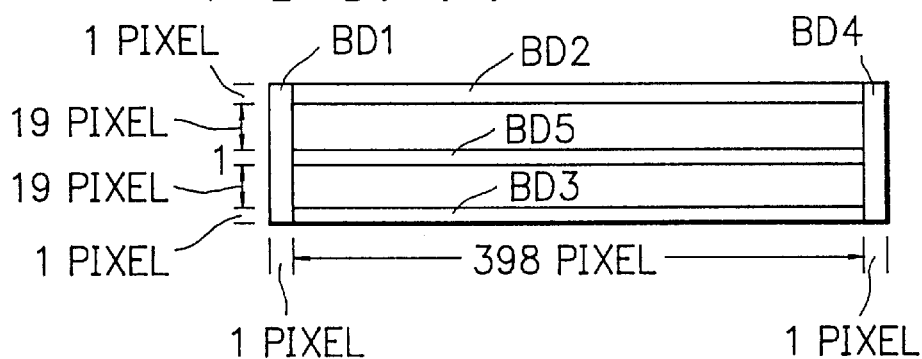
F I G. 14(c)
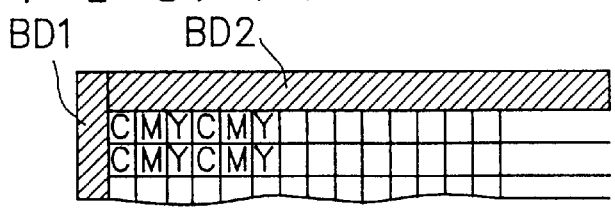
F I G. 14(d)
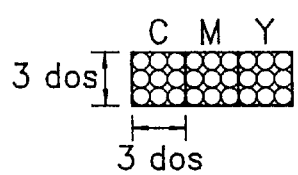
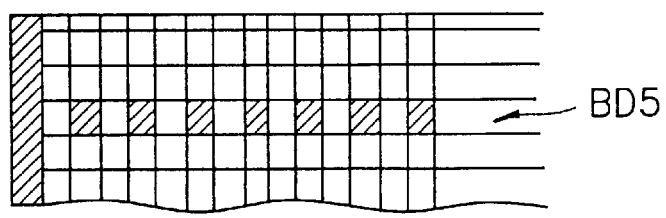

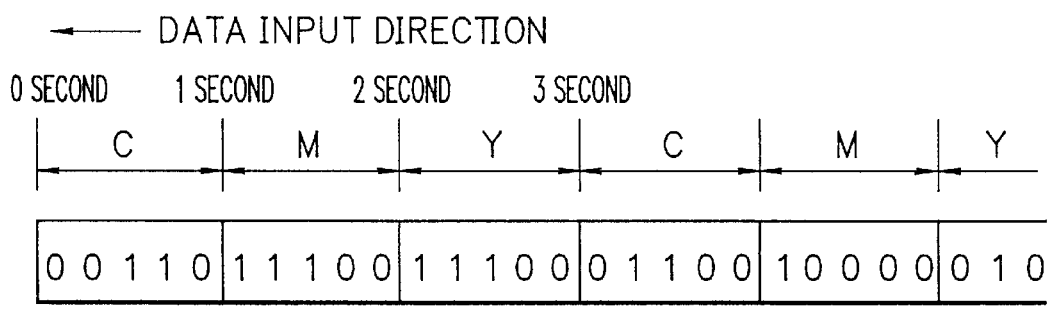

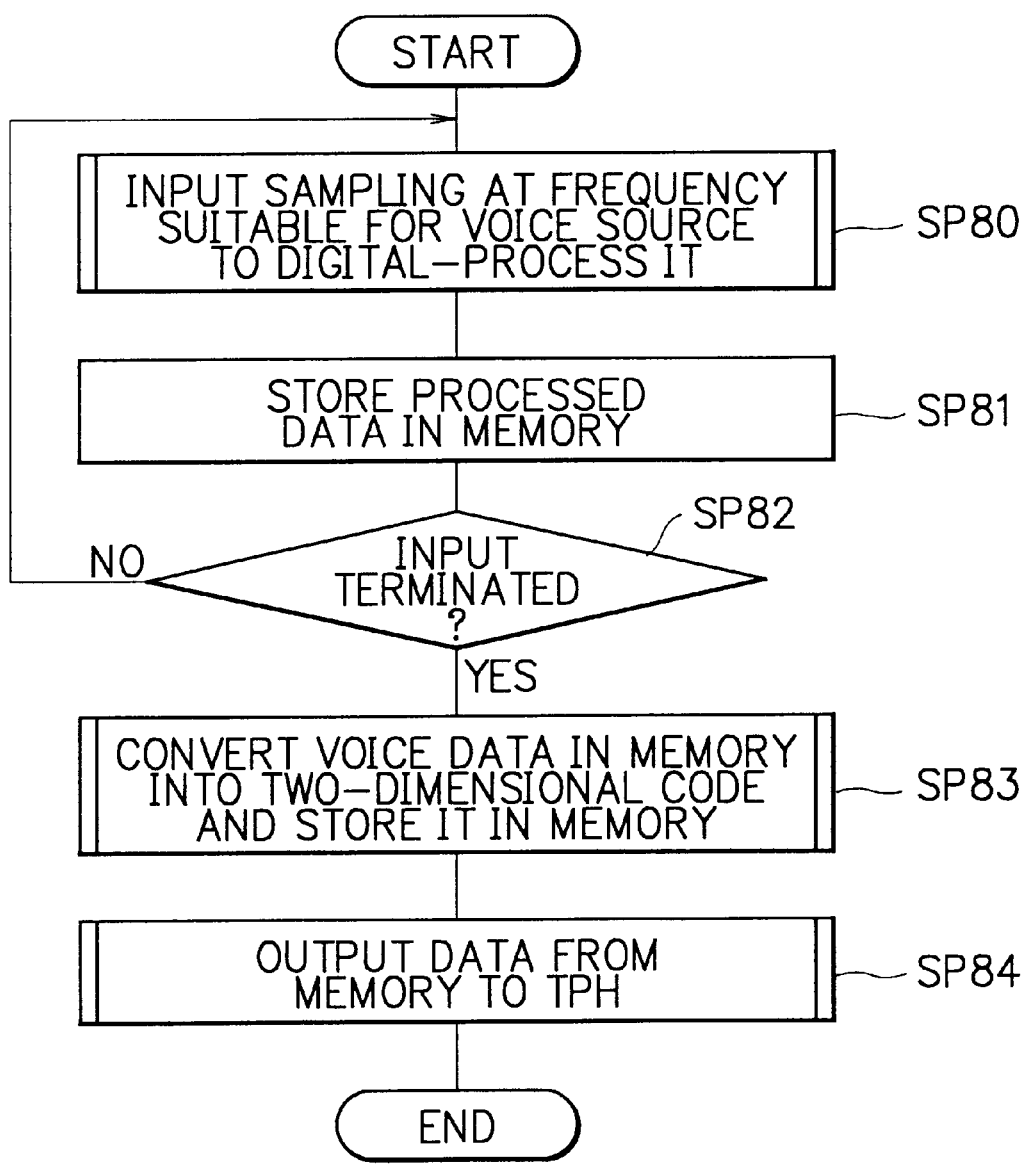

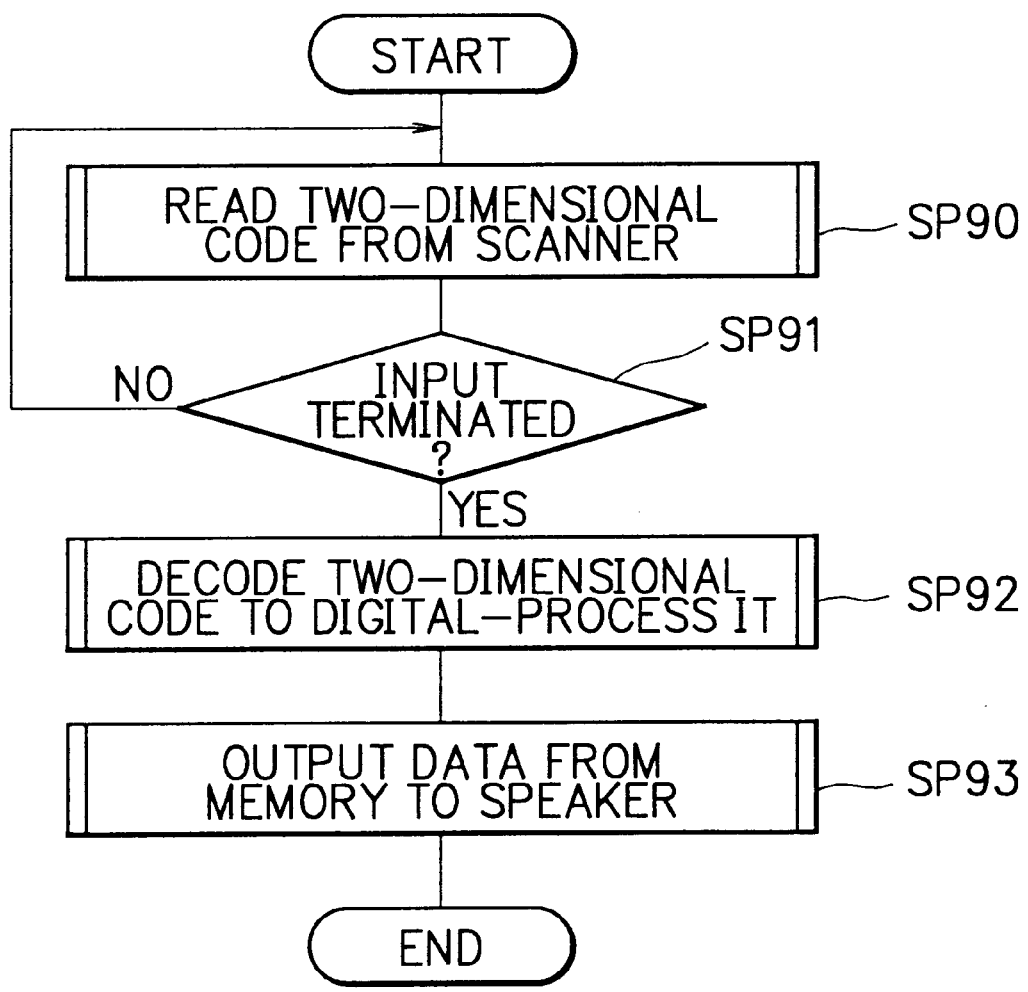

TWO-DIMENSIONAL COLOR CODE, PREPARING AND RESTORING METHOD FOR THE CODE AND APPARATUS THEREFOR

BACKGROUND OF THE INVENTION

1. Field of the Invention

The present invention relates to a two-dimensional color code, preparing and restoring method for the code and apparatus therefor in which data is coded by a recording apparatus or a system having a color code reading function, recorded and stored in a recording medium, and original data is restored from the coded data.

2. Description of the Related Art

In the ensuing explanation, a printing apparatus is used as a recording apparatus, and recording on a recording medium will be explained by way of printing on a printing sheet as a specific embodiment.

Bar codes so far well known are that a plurality of bars having a predetermined length is arranged in a row. Data is coded into a predetermined form in the state in which data can be read by an optical reading device, and data is represented by changing the width of bars and the width of a space between bars.

Further, it has been contemplated that the bar codes are colored in order to increase information amount thereof, which is known, for example, from Japanese Published Examined Patent Application No. Sho 61-217887. If there are a plurality of writable and readable colors as bar codes, the information amount recordable with the same density increases accordingly.

On the other hand, a two-dimensional code is contemplated as means for increasing the information amount.

Examples of two-dimensional codes known include one in which plural stages of one-dimensional bar codes are superposed in which a plurality of bars is laterally arranged in one row, and one in which a two-dimensional matrix is formed in a longitudinal direction and a lateral direction, and data is represented by a combination of states of pixels of the matrix.

Coloring of one-dimensional bar codes and coding of many information amounts by use of two-dimensional codes have been realized. However, there is mere use such that goods information in the physical distribution and production is coded to make use of information thereof.

On the other hand, kinds of information that can be coded include not only systematic information applied with codes constituted by English Figures in accordance with the predetermined rule as in goods information, but also plain information not systemized in which analog data is merely digitalized such as image information and voice information.

The latter information amount is much more than the former. If full color image data should be coded, there would require coded printed matter having a large area several times of a printing area of the original data.

Further, when the coded printed matter is made substantially equal to the printing area of the original data, resolution of the restored image results in very poor since information per unit area of the code is less.

Accordingly, in the present method, the data amount capable of being bar-coded is limited not to be able to correspond to coding of full color image data or the like.

Therefore, a system using a disk or the like applied with a magnetic memory as a storage medium is generally used as compared with a system using coded printed matter as a storage medium.

There are merits and demerits according to difference in storage media. The data storage using printed matter has the merit in that no space is occupied and the medium itself is cheap and tends to be lowered in cost. The procedure capable of coding many information with less area has been demanded.

The present invention has been achieved in order to solve the above-described problem. It is an object of the present invention to provide a code, and preparing and restoring method for the code and apparatus therefor, which can code many information amounts with less area and can use printing sheets as storage media even a large capacity of data.

SUMMARY OF THE INVENTION

According to a first aspect of this invention, there is provided a two-dimensional color code having color areas in which data is expressed by color codes corresponding to the data, and wherein a plurality of the color areas is arranged two-dimensionally in longitudinal and lateral directions corresponding to the plurality of data.

According to a second aspect of this invention, there is provided a two-dimensional color code having synchronous timing data which is a reference for synchronism when the two-dimensional color code of the first aspect is read, and wherein the synchronous timing data is formed from color not used as a code expressing a color area.

According to a third aspect of this invention, there is provided a two-dimensional color code in which one pixel data is color coded in three color areas corresponding to three original colors, cyan, magenta and yellow, each of the color areas is constituted by a plurality of divided partial areas, and one color out of a plurality of colors obtained by a combination of the three original colors is arranged in each partial area, and the one pixel data is expressed by a combination of colors arranged in the partial area and a combination of three color areas.

According to a fourth aspect of this invention, there is provided a method for preparing a two-dimensional color code comprising:

a first step of inputting original image data of an original image object;

a second step of calculating gradations of shades of colors of color components when one pixel of the original image data is color-separated by three original colors, cyan, magenta and yellow;

a third step of preparing color areas expressing numerical values indicative of gradations of shades of colors of the colors to use an assembly of one pixel portion of the color areas as a color code of the pixel; and a fourth step of recording the color code two-dimensionally in longitudinal and lateral directions of a recording medium.

According to a fifth aspect of this invention, there is provided a method for restoring a two-dimensional color code for obtaining restored image data on the basis of the two-dimensional color code prepared by the fourth step according to the fourth aspect comprising:

a fifth step of reading colors constituting color areas of the one pixel recorded on the recording medium;

a sixth step of calculating the gradations of shades of colors in the color areas by a combination of colors constituting the color areas within the color code;

a seventh step of setting the gradations of shades of colors of the three original colors in the one pixel on the basis of the gradations of shades of colors calculated separately of the colors to obtain the restored image data; and an eighth step of recording the restored image data on the recording medium to obtain a restored image object.

According to a sixth aspect of this invention, there is provided a method for preparing a two-dimensional color code comprising:

a first step of continuously inputting input data having predetermined bits;

a second step of dividing the input data continuously input 3-bit by 3-bit;

a third step of color-coding the input data of 3-bit divided as described into one pixel using one color out of a plurality of colors obtained by a combination of three original colors;

a fourth step of two-dimensionally arranging a plurality of color codes of the one pixel corresponding to the input data continuously input; and a fifth step of recording the thus arranged two-dimensional color code in a recording medium.

According to a seventh aspect of this invention, there is provided a method for restoring a two-dimensional color code for obtaining restored data on the basis of the two-dimensional color code prepared by the fifth step according to the sixth aspect comprising:

a sixth step of sequentially reading the two-dimensional color codes recorded in the recording medium;

a seventh step of converting each color code into restored data of a plurality of bits on the basis of color thereof; and an eighth step of sequentially outputting the restored data of a plurality of bits sequentially read.

According to an eighth aspect of this invention, there is provided an apparatus for preparing a two-dimensional colors code comprising:

a recording section for performing the recording using three original colors, cyan, magenta and yellow; and processing means for converting input data into a color code to output it to the recording section;

the processing means having a code conversion section for dividing pixels of the input data into three color areas corresponding to three original colors, cyan, magenta and yellow to color-code them;

the code conversion section setting colors obtained by a combination of the three original colors in the color areas corresponding to contents of the input data whereby the input data are color-coded by the combination of three color areas, which are then two-dimensionally arranged corresponding to the plurality of input data to output them to the recording section.

According to a ninth aspect of this invention, there is provided an apparatus for preparing and restoring a two-dimensional color code in which color areas expressing input data by colors corresponding to the input data are arranged two-dimensionally, comprising:

a recording section for recording in a recording medium using three original colors, cyan, magenta and yellow;

a reading section for reading three original colors, cyan, magenta and yellow recorded in the recording medium; and processing means in which when the two-dimensional color code is prepared, three color areas corresponding to three original colors, CMY, of input data are divided and set, and colors obtained by a combination of the three original colors are arranged in the color areas corresponding to the contents of the input data whereby the input data are color-coded by the combination of three color areas to prepare two-dimensional color codes to output them to the recording section, whereas when the input data on the basis of the two-dimensional color codes is restored, the contents of data are restored on the basis of the combination of three color areas read by the reading section to output them.

According to a tenth aspect of this invention, there is provided an apparatus for preparing a two-dimensional color code, comprising:

a reading section for reading and outputting original image data on an original image object;

means for calculating gradations of shades of colors of cyan, magenta and yellow occupied by one pixel of the original image data;

color code preparation means for preparing color areas expressing numerical values indicative of gradations of shades of the colors by a combination of corresponding colors and using an assembly of one pixel portion of the color areas as color codes of the pixel; and a recording section for recording the color codes prepared by the color code preparation means two-dimensionally in longitudinal and lateral directions of a recording medium.

According to an eleventh aspect of this invention, there is provided an apparatus for restoring a two-dimensional color code for obtaining restored image data on the basis of the two-dimensional color codes prepared by the apparatus according to the tenth aspect, comprising:

a reading section for reading colors constituting color areas of the one pixel recorded in the recording medium;

means for calculating the gradations of shades of colors in the color areas by a combination of colors constituting the color areas in the color codes;

means for setting the gradations of shades of colors of the three original colors in the one pixel on the basis of the gradations of shades of color calculated separately of the colors; and a recording section for recording the restored image data in the recording medium to obtain a restored image object.

According to a twelfth aspect of this invention, there is provided an apparatus for preparing and restoring a two-dimensional color code comprising: the apparatus for preparing a two-dimensional color code according to the tenth aspect, and the apparatus for restoring a two-dimensional color code according to the eleventh aspect.

According to a thirteenth aspect of this invention, there is provided an apparatus for preparing and restoring a two-dimensional color code according to the ninth aspect or the twelfth aspect comprising: a synchronous timing producing section in which one color except colors used for the two-dimensional color codes is preset, and when the two-dimensional color code is prepared, synchronous timing data is arranged, the reading section is provided with an synchronous section for taking a synchronism on the basis of the synchronous timing data provided n the two-dimensional color code when the two-dimensional color code is read.

According to a fourteenth aspect of this invention, there is provided an apparatus for preparing and restoring a two-dimensional color code according to the ninth aspect or the twelfth aspect comprising: a synchronous timing producing section in which one color except colors used for the two-dimensional color codes is preset, and synchronous timing data is arranged every two-dimensional color code of a predetermined number of pixels;

the reading section being provided with a synchronous section for taking a synchronism on the basis of the synchronous timing data recorded every predetermined number of pixels when the two-dimensional color code is read.

According to a fifteenth aspect of this invention, there is provided an apparatus for preparing and restoring a two-dimensional color code according to the ninth aspect or the twelfth aspect, wherein when the two-dimensional color code is prepared, error correcting computation on the basis of the two-dimensional color code of a predetermined number of pixels is performed every preparation of the two-dimensional color code of a predetermined number of pixels, and an error correcting code corresponding to the results of computation is arranged, and in an error correcting section, when the two-dimensional color code is read, error correcting computation on the basis of the two-dimensional color code of a predetermined number of pixels read is performed, and judgement is made whether or not the result of computation coincides with the error correcting code, and when not coincided, corresponding error processing is performed.

According to a sixteenth aspect of this invention, there is provided an apparatus for preparing a two-dimensional color code, comprising:

a reading section for reading and outputting gradations of shades of color of RGB components occupied by one pixel of original image data on an original image object;

a color coordinate conversion section for color-coordinate converting the gradations of shades of color in a RGB color coordinate system output from the reading section into a color coordinate system of cyan, magenta and yellow (CMY);

a conversion table in which color codes corresponding to gradations of shades of color separately of CMY colors are stored in advance;

a code conversion section for converting the gradations of shades of color into corresponding color codes referring to the conversion table to arrange them in color areas separately of CMY colors; and a recording section for two-dimensionally arranging the color codes arranged in the color areas to record them in a recording medium.

According to a seventeenth aspect of this invention, there is provided an apparatus for preparing a two-dimensional color code according to the sixteenth aspect, wherein plural colors of color codes obtained by a combination of three original colors, CMY, are stored in the conversion table in the form of a combination of two longitudinal and lateral rows, and the code conversion section is arranged with two-color color codes output from the conversion table divided into two within the corresponding color areas.

According to an eighteenth aspect of this invention, there is provided an apparatus for restoring a two-dimensional color code in which the constitutional sections provided in the apparatus for preparing a two-dimensional color code according to the sixteenth aspect are used to obtain restored image data on the basis of the two-dimensional color code, wherein the constitutional sections when the apparatus is used for restoration are as follows:

the reading section reads colors in color areas by the RGB coordinate system to output them;

the conversion table obtains gradations of shades of color separately of CMY colors on the basis of color data of the color areas;

the code conversion section refers to the conversion table to output gradations of shades of color separately of CMY colors corresponding to the two-dimensional color codes; and the recording section records the restored image data in the recording medium on the basis of gradations of shades of color separately of CMY colors.

According to a nineteenth aspect of this invention, there is provided an apparatus for preparing a two-dimensional color code, comprising:

processing means for dividing input data having predetermined bits continuously input by plural bits, sequentially color-coding the thus divided input data of plural bits pixel by pixel using one color out of plural colors obtained by a combination of three original colors to two-dimensionally arrange a plurality of pixels; and a recording section for recording the two-dimensional color codes of a row of pixels arranged by the processing means in the recording medium.

According to a twentieth aspect of this invention, there is provided an apparatus for restoring a two-dimensional color code for obtaining restored data on the basis of the two-dimensional color codes prepared by the preparation apparatus according to the nineteenth aspect, comprising:

a reading section for sequentially reading the two-dimensional color codes recorded in the recording medium; and processing means for sequentially converting colors of the color codes read by the reading section into corresponding restored data of plural bits obtained by a combination of three original colors to continuously output them in order of conversion.

According to a twenty-first aspect of this invention, there is provided an apparatus for preparing a two-dimensional color code, comprising:

a data input section for sampling voice data input at a predetermined sampling frequency;

a conversion table in which color codes corresponding to data values of sampling data are stored in advance;

a code conversion section for converting the sampling data into corresponding color codes referring to the conversion table; and a recording section for recording the color codes arranged in the color rears in a recording medium.

According to a twenty-second aspect of this invention, there is provided an apparatus for restoring a two-dimensional color code in which the constitutional sections provided in the apparatus for preparing a two-dimensional color code according to the twenty-first aspect are used in common to obtain restored voice data on the basis of the two-dimensional color codes, comprising:

a reading section for reading the thus prepared two-dimensional color codes by a RGB coordinate system to output them; and a color conversion section for converting data of the two-dimensional color codes output from the reading section into a color coordinate system of cyan, magenta and yellow (CMY), the code conversion section outputting sampling data corresponding to the two-dimensional color codes referring to the conversion table.

The two-dimensional color code according to the first aspect of this invention has color areas expressing data by color codes corresponding to the data. A plurality of color areas is arranged two-dimensionally in longitudinal and lateral directions corresponding to a plurality of data, and therefore, a large capacity of data can be coded.

In the apparatus for preparing a two-dimensional color code according to the sixteenth aspect of this invention, the reading section reads an original image object to output original image data. In the processing means, after color conversion from RGB to CMY has been carried out by the color conversion section, it is output to the code conversion section.

The code conversion section converts gradations of shades of colors of CMY of one pixel to corresponding color codes referring to the conversion table. The color codes are arranged in the partial area obtained by dividing the color areas, CMY, into two parts.

The color codes are printed on a code print by the recording section and stored.

In the apparatus for restoring a two-dimensional color code according to the eighteenth aspect of this invention, the constitutions of the preparation apparatus are used for restoration whereby restored image objects can be prepared by using the color codes printed on the code print.

BRIEF DESCRIPTION OF THE DRAWINGS

FIG. 1 is a view showing the form of an embodiment of a two-dimensional color code according to the present invention;

FIG. 2 is a view showing a combination of colors printed on two partial areas of the two-dimensional color code;

FIGS. 4A and 4B are views showing original image objects, FIG. 4A being an entire view of the original image object, FIG. 4B being an enlarged view showing one pixel of the original image object;

FIGS. 5A and 5B are views showing printing sheets, FIG. 5A being an entire view of the printing sheet, FIG. 5B being an enlarged view showing one code of the printing sheet;

FIGS. 14A to 14D are views showing a printing example of the two-dimensional color code according to another embodiment, FIG. 14A being a view showing a printing sheet on which the two-dimensional color code is printed, FIG. 14B being a view showing one block of the two-dimensional color code, FIG. 14C being an enlarged view of the one block, FIG. 14D being a view showing the dot constitution of the pixel;

FIGS. 16A to 16C are views showing the data conversion state according to another embodiment, FIG. 16A being a view showing the input data continuously input, FIG. 16B being a view showing the state in which input data is divided, FIG. 16C being a view showing color codes after conversion of input data;

FIG. 17 is a flowchart for preparing a two-dimensional color code from voice data according to another embodiment; and FIG. 18 is a flowchart for the preparation of restored voice data.

DETAILED DESCRIPTION

Figure 3:
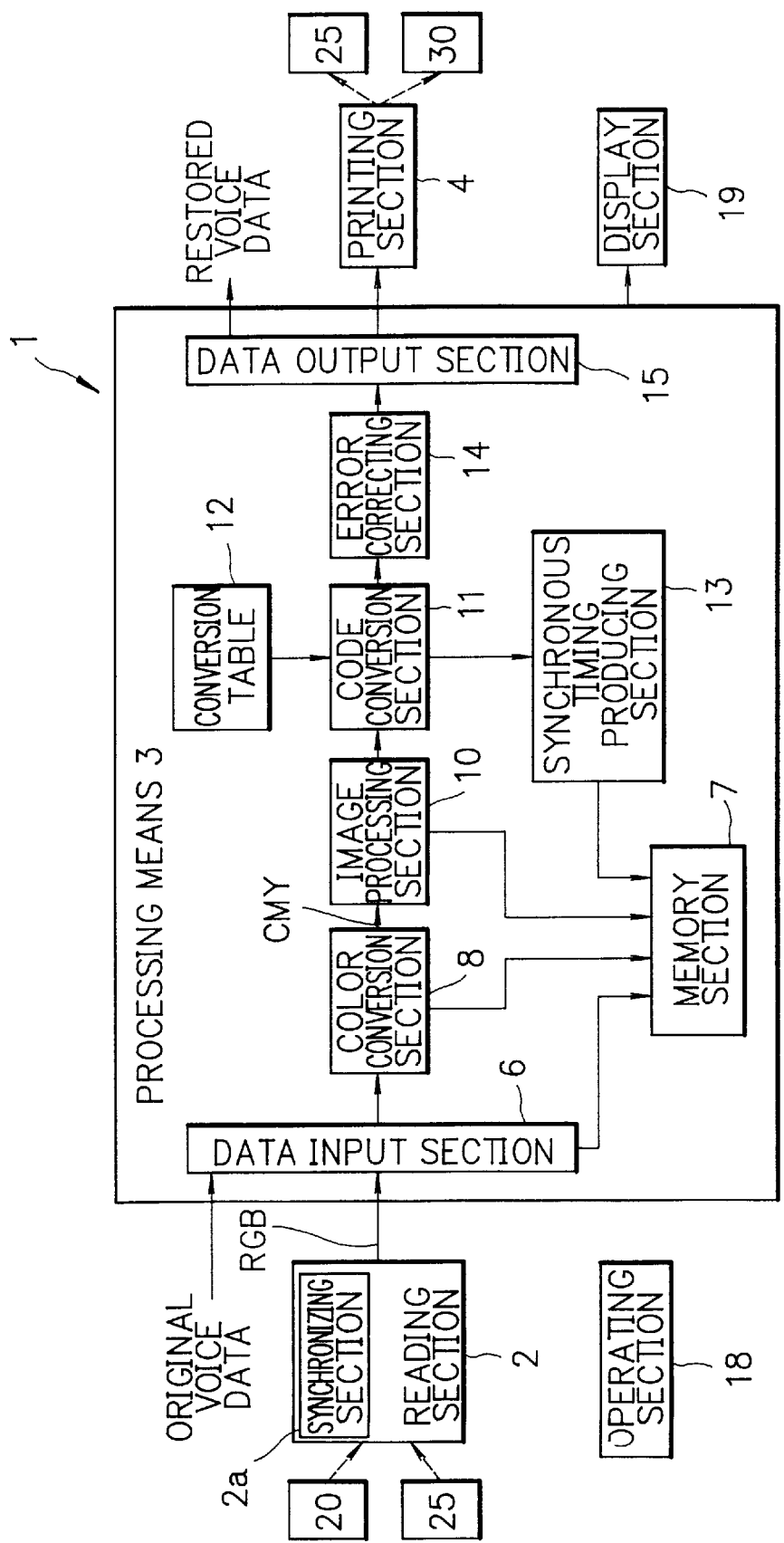
FIG. 3 is a block diagram showing the preparing and restoring apparatus of the two-dimensional color code according to the present invention.

FIG. 1 is a view showing a two-dimensional color code according to the present invention.

It is supposed here that the kind of data to be coded is full color image data read as multi-gradation data by means of a scanner or the like.

FIG. 1 shows one example of a code array when one pixel portion of image data read from an original image object is coded. Accordingly, it is necessary for coding all the image data of the original image object to longitudinally and laterally array of two-dimensional color codes shown in FIG. 1 in at least the same number as that of pixels unless compression is applied.

The image data of one pixel portion is expressed by three color areas, cyan C, magenta M and yellow Y, and each color area is composed of a partial area divided into two parts as C1, C2, M1, M2, Y1, Y2.

These three color areas show gradations of colors (cyan, magenta and yellow) used when a code is read to obtain one pixel of restored image data.

Predetermined colors corresponding to the gradations are printed on these three color areas. A two-dimensional color code is formed by this printing.

For example, color based on a combination of colors, cyan, magenta and yellow, is code-printed on the color area C of cyan.

FIG. 2 is a view showing a combination of colors printed on two partial areas.

As shown in FIG. 2, eight colors can be prepared by a combination of cyan, magenta and yellow. Seven colors (white, yellow, magenta, red, cyan, green and blue) except black are used in the partial areas C1, C2, M1, M2, Y1, Y2. White is color of a printing paper of sheet (white sheet) and is obtained by not applying code printing.

Thereby, for example, a combination of the partial areas C1 and C2, cyan, divided into two parts, is a combination of 7-color×7-color, to obtain 49 combinations.

In FIG. 2, numbers from 0 to 48, totalling 49, are indicated with respect to all the combinations of C1 and C2. Thereby, colors to be printed with C1 and C2 can be primarily specified by selecting one out of these suitable numbers.

Therefore, if a cyan component of multi-gradation data read from the original image object can be expressed within 49 gradations, it is possible to derive, without fail, a combination of C1 and C2 corresponding to gradations of shades of color of the cyan component of a certain pixel.

For example, in the case where when original image data of one pixel of the original image object is read, the gradations of shades of color corresponding to cyan color are 27, the partial area C1 to be code-printed on a printing sheet is printed with "blue" and C2 is printed with "red" on the basis of the combination shown in FIG. 2.

Similarly, also with respect to magenta and yellow, gradations of shades of color of 48 levels are color-printed on a printing sheet with color by the color areas M and Y.

Since one in which an original image object is subjected to two-dimensional color coding is printed on this printing sheet, it is possible to obtain restored image data again using the printing sheet.

Thereby, even if the original image object is lost or discolored, it can be restored using a printing sheet. Further, image data can be stored and transported without the original image object becoming known in the surroundings.

When restored image data is obtained using a printing sheet, the color area C of cyan is read. When reading, cyan colors are that C1 is "blue" and C2 is "red", so that discrimination is made that the gradations of shades of color are 27 on he basis of the combination shown in FIG. 2.

The gradations of shades of color=27 indicate gradations of shades of color of cyan color used when restored image data is obtained.

Code prints C, M, and Y of one pixel indicate a mixing degree of cyan, magenta and yellow in the whole area of one pixel of restored image data.

That is, a mixture of these cyan, magenta and yellow with gradations of shades of colors is image-formed in the whole area of range of one pixel when restored image data is prepared.

Since the original image object is an assembly having a plurality of original image data of one pixel unit, two-dimensional color codes on a printing sheet are also composed of an assembly in which a plurality of pixels shown in FIG. 1 is arranged in a predetermined array.

A first embodiment of an apparatus for preparing and restoring a two-dimensional color code according to the present invention will be explained hereinafter.

FIG. 3 is a block diagram showing an apparatus 1 for preparing and restoring a two-dimensional color code. A printing sheet is prepared in which a two-dimensional color code is printed from an original image object.

Conversely, the same restored image data as the original image object is printed by the two-dimensional color code of a printing sheet.

This apparatus 1 roughly comprises processing means 3 comprising a hardware such as CPU, ROM, and RAM and a software such as a control program for executing the operation of CPU stored in ROM, a reading section 2 such as a scanner, and a printing section 4 such as a printer.

The scanner constituting the reading section 2 reads an original image object or a two-dimensional color code described later. The two-dimensional color code is produced from the original image object. For the convenience's sake, in ensuing explanation of various constitutions, reading of an original image object will be first explained, and others will follow.

FIG. 4A is an entire view showing an original image object 20. The original image object 20 comprises printed matter such as letters or characters, images, etc., photographs (colored, monochromatic), etc.

The reading section 2 has a predetermined resolution and reads original image data of the original image object 20. For example, the reading section 2 reads longitudinal 6 dots×lateral 8 dots (here, 12 dots/mm) as one pixel, as shown in FIG. 4B, and reads gradations of shades of color of RGB (red, green and blue) in one pixel to output them to the processing means 3.

When the size of the original image object 2 is lateral 100 mm×longitudinal 150 mm, the reading section 2 reads the original image data with a resolution of lateral 1200 dots (150 pixels)×longitudinal 1800 dots (300 pixels). The total number of pixels of the original image object 20 is 45,000 pixels.

The reading section 2 repeats the procedure for the main scanning reading in which several lines are simultaneously read in one scanning in a lateral direction of pixel, after which the original image object 20 is moved in a sub-scanning direction, and the main scanning reading for next lines.

The reading section 2 has the performance capable of reading the shades of colors of RGB with multi-gradations.

Although described later, in the present embodiment, the gradations of shades of color in the processing means 3 are set to 48 gradations, and the reading section 2 can perform reading corresponding to the aforesaid gradations.

Data of various types is input into a data input section 6 of the processing means 3, and the data input section 6 performs the process for taking them into the apparatus. The data input section 6 sequentially takes in original image data sequentially output from the reading section 2 to output them to a color conversion section 8. Predetermined areas of a memory section 7 are used for a temporary storage as a RGB image memory.

The color conversion section 8 converts original image data of RGB output from the data input section 6 to colors of CMY.

The conversion from RGB (the three primary colors of additive color mixture) to CMY (the same of substractive color mixture) is carried out by the processing technique using a universal conversion system. By this conversion process, gradations of shades of color separately of RGB read by the reading section 2 is replaced by gradations of shades of color separately of CMY.

At this color conversion, predetermined areas of the memory section 7 are used for temporary storage.

An image processing section 10 processes original image data of colors output from the color conversion section 8 to output them to a code conversion section 11. At this time, predetermined areas of the memory section 7 are used for temporary storage for processing images.

The contents of image processing include processes such as correction of original image data, interpolation, error diffusion, dither method, etc., which are suitably selected corresponding to the contents of original images.

The code conversion section 11 converts original image data of CMY output from the image processing section 10 into two-dimensional color codes of a predetermined conversion type.

In this conversion type, with respect to the respective CMY of original image data of one pixel, gradations of shades of color of 48 levels input are represented as a single code with a combination of two partial areas, as shown in FIG. 2.

That is, a conversion table 12 stores a conversion table shown in FIG. 2. While FIG. 2 shows a conversion table of cyan C out of original image data, it is noted that magenta and yellow are to be stored in a similar conversion table.

Two-dimensional color codes converted by the code conversion section 11 are developed in an area of a coded memory of a part of the memory section 7.

By this development, color areas CMY indicative of gradations of shades of colors laterally are formed as shown in FIG. 5B, each color area being divided into two partial areas C1, C2, M1, M2, Y1, Y2 longitudinally.

The code conversion section 11 outputs a synchronous timing indicative of division of each two-dimensional color code.

A synchronous timing producing section 13 adds synchronous timing data to a two-dimensional color code developed in the memory section 7 on the basis of the synchronous timing output from the code conversion section 11.

This synchronization is necessary to recognize the division of a plurality of two-dimensional color codes when the two-dimensional color codes are read and scanned.

When a synchronous timing is provided every two-dimensional color code, a predetermined color is developed in a timing area BK of lateral 2 dots×longitudinal 6 dots at the end of main scanning direction of a single two-dimensional color code, as shown in FIG. 5B.

Since the timing area BK is continuously provided on the line of partial areas C1, C2 to Y1, Y2, colors other than those used in the partial areas C1, C2 to Y1, Y2 are used. In this example, black is used.

The timing area BK can be provided in various places while adjusting to the modes of the two-dimensional color codes. However, if the reading section 2 is of the constitution in which the main scanning is carried out with one line, when the two-dimensional color code is read, the timing area BK is provided along the arrangement of the two-dimensional color codes.

An error correcting section 14 is used when an error is corrected as will be described later. However, in the following explanation, the error correction is not carried out but the passage of signals will be explained. The constitution of the error correcting section 14 will be described later.

A data output section 15 outputs the two-dimensional color code to various external apparatuses externally of the processing means 3. Therefore, the section 15 converts the code into an input type of the external apparatus to output it.

The two-dimensional color code converted by the code conversion section 11 is output to the printing section 4, and is code-printed on a printing sheet 25 shown in FIG. 5A. Accordingly, the data output section 15, when outputting to the printing section 4, outputs the two-dimensional color code in the type corresponding to the input type of the printing section 4.

The printing section 4 prints the two-dimensional color code output from the processing means 3 on the printing sheet 25.

The printing section 4 is composed of a dot printer which prints one pixel of longitudinal 6 dots×lateral 8 dots with a resolution of 12 dots/mm, as shown in FIG. 5B, for example. Cyan C, magenta M and yellow Y are printed two by two rows (two-dimensional) with lateral 2 dots×longitudinal 3 dots in the range of one pixel to prepare a single two-dimensional color code. Further, a timing area BK with the size of lateral 2 dots×longitudinal 6 dots is printed in black continuous to the printing of CMY.

The printing section 4 repeats the procedure of main scan printing moving one line in a lateral direction of a two-dimensional color code, then Subscanning in a longitudinal direction, and main scan printing next line.

Accordingly, the printing section 4 can have all the original image data of the original image object 20 two-dimensional color coded to print them if there is provided a printing sheet 25 with the size of lateral 1200 dots (150 pixels)×longitudinal 1800 dots (300 pixels).

In this case, the size of the printing sheet 25 is lateral 100 mm×longitudinal 150 mm, which is the size similar to the original image object 20. That is, there is obtained a printing sheet 25 with the original image object 20 two-dimensional color coded with the size similar to the original image object 20. In this case, the total number of codes on the printing sheet 25 is 45,000 codes.

The processing means 3 has an operating section 18 such as a keyboard and a display section 19 such as CRT connected thereto for various settings and inputs and display of operating contents.

A description will be made hereinafter of the constitution of apparatus for obtaining a restored image object 30 using a printing sheet 25 on which two-dimensional color codes are printed. The explanation of the constitutions previously explained will be omitted.

The printing sheet 25 having the two-dimensional color codes printed thereon is read by the reading section 2. The reading section 2 is provided with a synchronizing section 2a to read the timing area BK added to the two-dimensional color code to synchronize the reading and scanning.

For example, when one timing area BK is provided every code as shown in FIG. 5B, synchronization can be made every time one code is read.

By this synchronization, it is possible to prevent erroneous reading due to a difference in reading and scanning speed.

Data output from the reading section 2 is converted in color from RGB to CMY by the color conversion section 8 through the data input section 6 of the processing means, after which it is output to the image processing section 10 and subjected to image processing as necessary.

The code conversion section 11 outputs gradations of shades of color corresponding to the two-dimensional color codes using the conversion table 12 separately of colors CMY. That is, the conversion table 12 is used with reverse conversion unlike the processing for obtaining the two-dimensional color codes from the original image object.

At that time, corresponding gradations of shades of colors (predetermined gradations out of 48 gradations) are obtained on the basis of a combination of two partial areas C1 and C2, M1 and M2 and Y1 and Y2 by colors shown in FIG. 5B.

The synchronous timing producing section 13 is not operated at the time of restoring and processing of a restored image object 30 on the basis of the two-dimensional color code.

The data output section 15 designates gradations of shades of colors CMY to output them to various external apparatuses externally of the processing means 3.

The printing section 4 prints restored image data on a printing body on the basis of gradations of shades of colors CMY output from the processing means 3.

The restored image object 30 has the size similar to that of the original image object 20 shown in FIG. 4A. The restored image data is constituted by an assembly of one pixel shown in FIG. 4B. That is, this restored image object 30 corresponds to a restored object of the original image object 20.

The apparatus 1 for preparing and restoring a two-dimensional color code of the present invention according to the aforementioned construction prepares the printing sheet 25 having a two-dimensional color code printed from the original image object 20 and obtains the restored image object 30 from the printing sheet 25. Further, a plurality of restored image objects 30 are obtained from a single printing sheet 25.

Figure 6A:
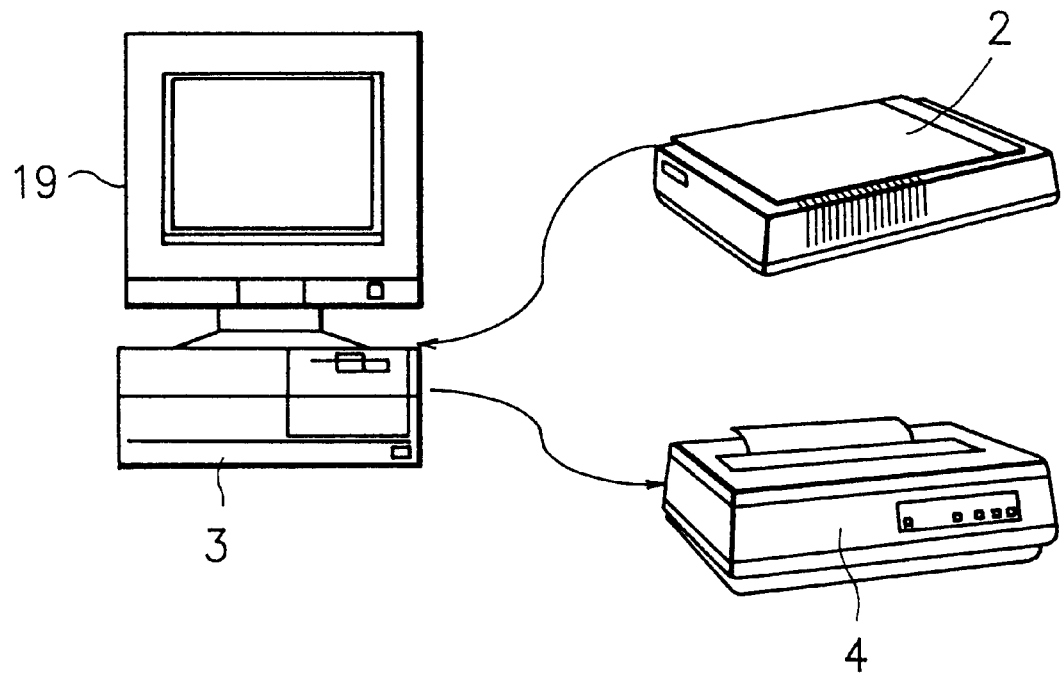
FIGS. 6A and 6B are views showing constitutional examples of the preparing and restoring apparatus of the two-dimensional color code according to the present invention, FIG. 6A being a view showing the entire constitution, FIG. 6B being a view showing a reading and printing apparatus according to another constitutional example.

FIG. 6A shows an example of specific constitution of the apparatus 1 for preparing and restoring a two-dimensional color code.

The reading section 2 is composed of a scanner device shown, and the printing section 4 is composed of a color printer. The processing means 3 is composed of a personal computer provided with CPU, and the scanner and printer are connected to input/output ports of the personal computer.

An operating section 18 is composed of a keyboard and a mouse not shown, and a display section 19 is composed of CRT.

Figure 6B:
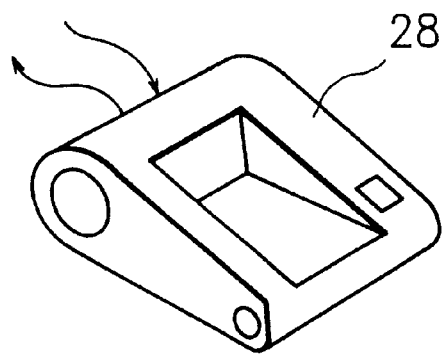

Further, as shown in FIG. 6B, there can be used a reading and printing device 28 provided with functions of the reading section 2 and the printing section 4.

The reading and printing device 28 is provided with only one carrying path, and all the printing sheets for printing an original image object and a two-dimensional color code and printing sheets for printing a restored image are fed and ejected by one and the same carrying path.

The reading section 2 and the printing section 4 within the reading and printing device 28 are fixed to each other, and both reading scanning and printing scanning can be realized by one and the same scanning mechanism, thus simplifying the constitution.

In the following, the operation of the apparatus constructed as described above will be explained in greater detail.

Figure 7:
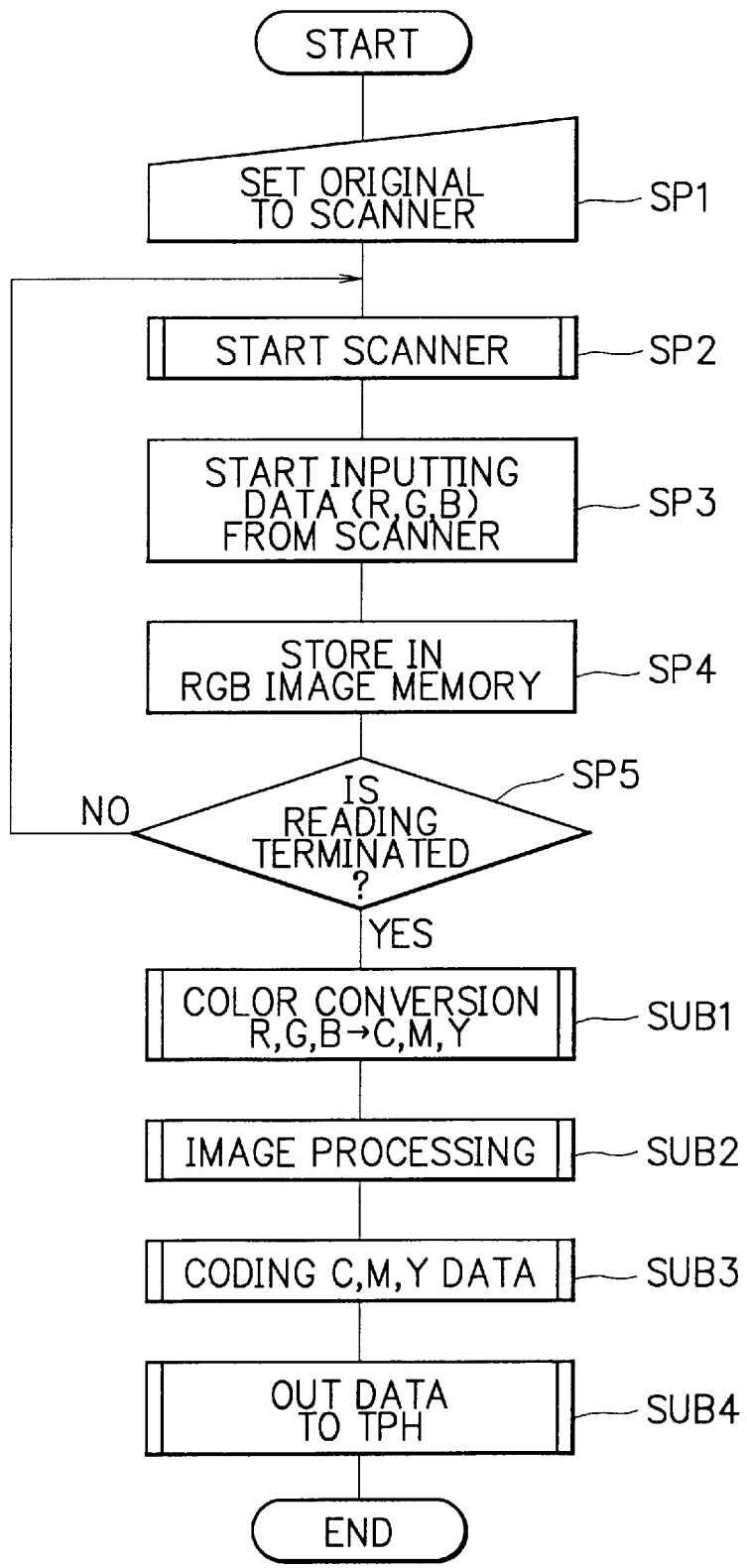
FIG. 7 is a flowchart showing the fundamental operation of the preparation of the two-dimensional color code according to the present apparatus.

FIG. 7 is a flowchart showing the fundamental operation for preparing a two-dimensional color code.

The original image object 20 is set on a reading surface of the reading section 2 (SP 1), and the reading section 2 is started (SP 2). Then, the reading section 2 line-moves the original image object 20 in a main scanning direction to start reading.

The data input section 6 of the processing means 3 inputs original image data of RGB output from the reading section 2 (SP 3) to store it in the RGB image memory of the memory section 7 (SP 4).

The reading section 2 continuously reads the original image object 20 to its final line, and original image data for one surface portion of the original image object 20 is stored in the memory section 7 accordingly (SP 5).

Next, the color conversion section 8 reads the original image data of RGB stored in the memory section 7 to perform color conversion from RGB to CMY (SUB 1).

The original image data after color conversion is subjected to image processing by the image processing section 10 (SUB 2).

The original image data after image processing is converted into the two-dimensional color code by the code conversion section 11 (SUB 3).

The thus converted two-dimensional color code is output to the printing section 4 from the data output section 15, and the two-dimensional color code is printed on the printing sheet 25 (SUB 4).

By the aforementioned operation, the printing sheet 25 on which two-dimensional color code is printed using the original image object 20 is prepared.

The above-described subroutines (SUB 1 to SUB 4) will be explained hereinafter.

Figure 8:
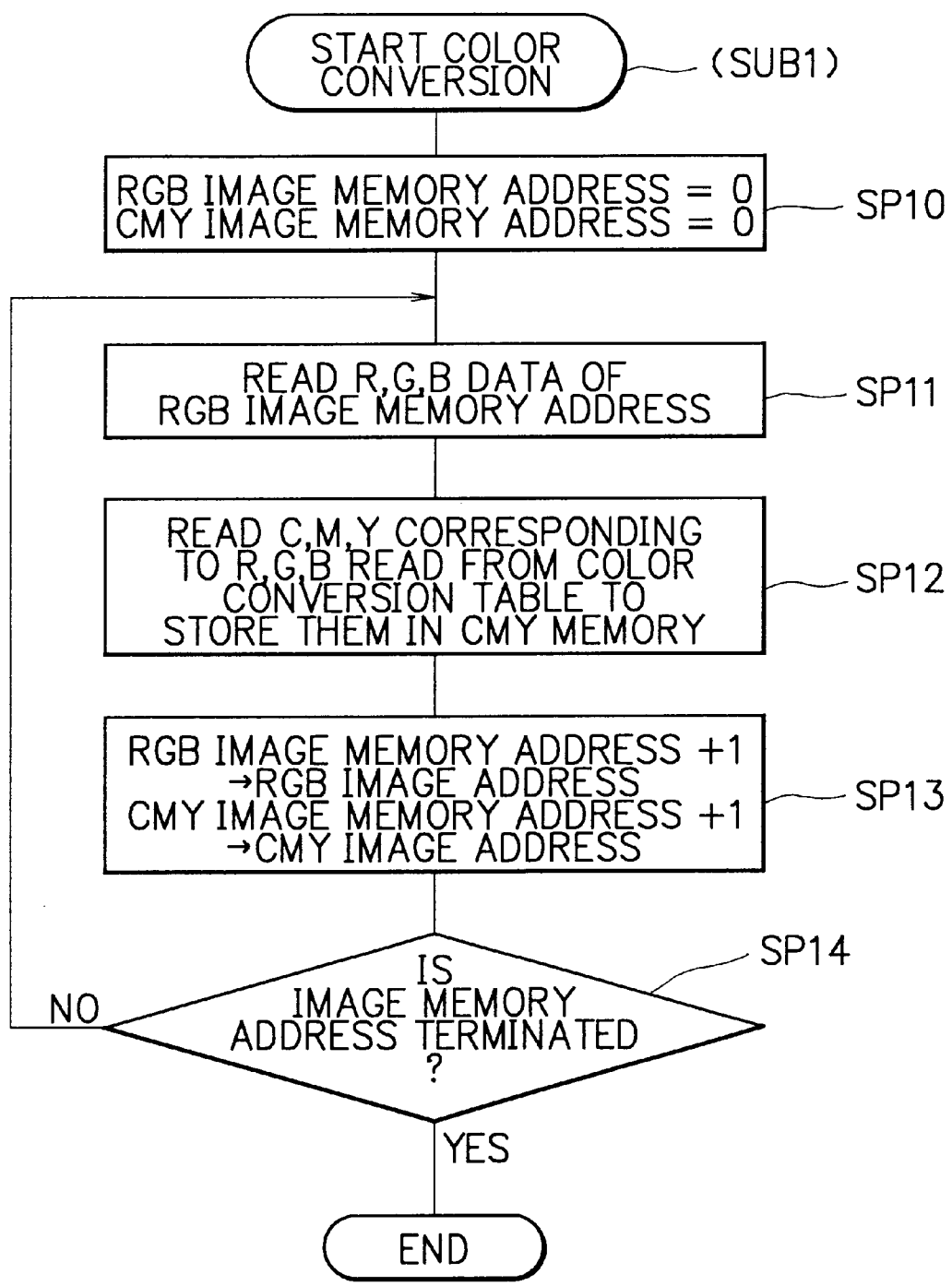
FIG. 8 is a flowchart showing the color conversion process in the color conversion processing.

FIG. 8 is a flowchart of a subroutine (SUB 1) showing the color conversion processing in the color conversion section 8.

The color conversion section 8 sets a RGB image memory address and a CMY image memory address to an initial value (0) at the start of color conversion (SP 10).

Both the RC GB image memory address and the CMY image memory are formed in a predetermined area of the memory section 7. The RGB image memory stores original image data when read by the reading section 2, and original image data after color conversion is stored in the CYM image memory.

Next, original image data for one pixel is read from an address designated by the RGB image memory (SP 11).

Then, the original image data is stored in the CMY image memory converted to color of CMY corresponding to RGB using the color conversion table (SP 12).

After this, the RGB image memory address and the CMY image memory address are made incremental (SP 13).

Thereafter, judgement is made whether or not the RGB image memory address reaches a final address (SP 14). When not reached, processes after SP 11 are continued.

Thereby, the original image data in the whole area of the original image object 20 is converted in color from RGB to CYM.

Figure 9:
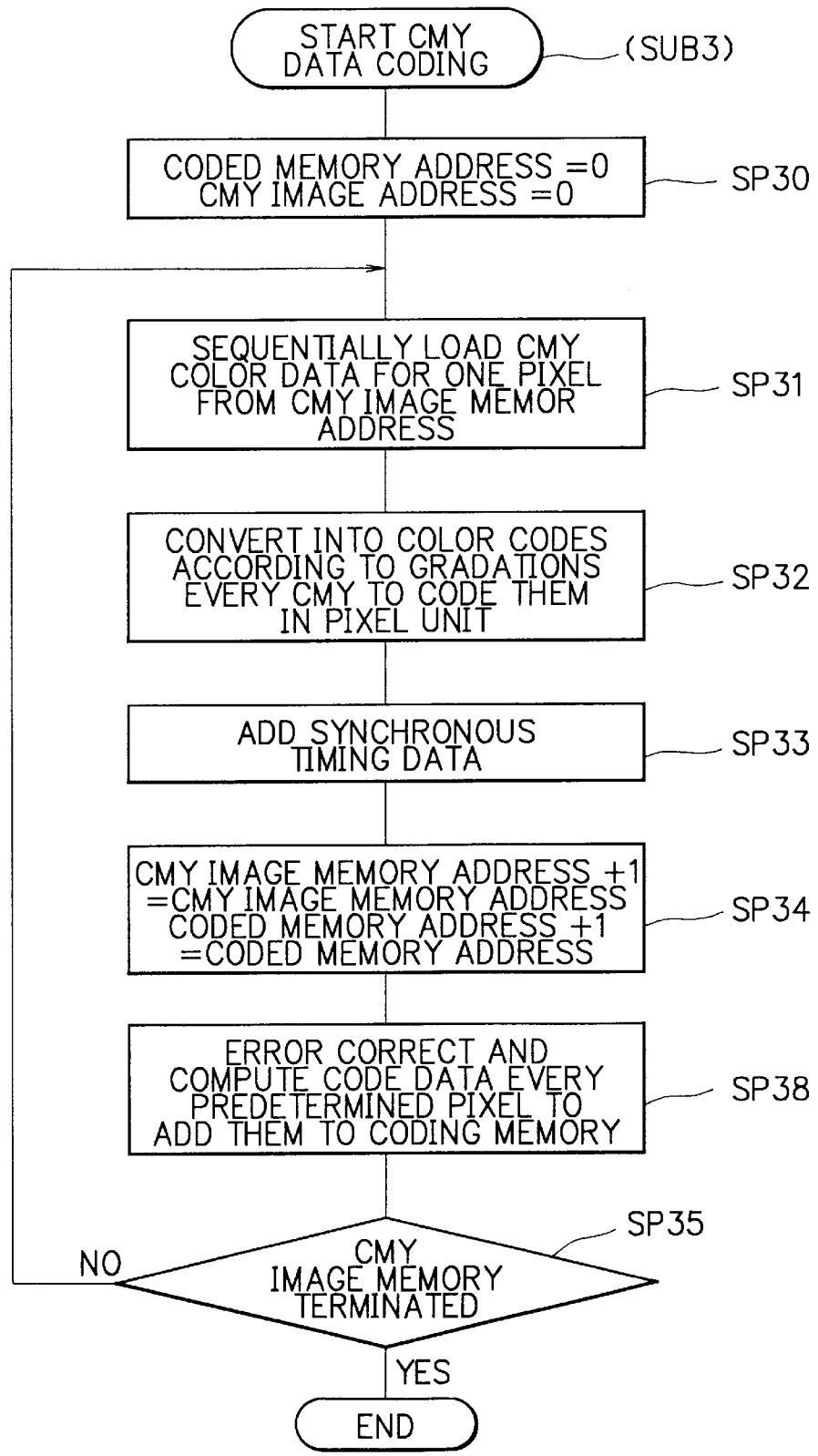
FIG. 9 is a flowchart showing the code conversion process in the code conversion section.

FIG. 9 is a flowchart of a subroutine (SUB 3) showing the preparing process for a two-dimensional color code in the code conversion section 11. The code conversion section 11 sets a CMY image address and a coded memory address to an initial value (0) at the start of code conversion (SP 30).

Both the CMY image memory and the coded memory are formed in a predetermined area of the memory section 7.

Next, the original image data for one pixel portion is read from the address designated by the CMY image memory (SP 31). Since one pixel is formed by colors, CMY, they are individually read with respect to C, M and Y.

The code conversion section 11 first converts a gradation of shades of color of C (cyan color) read into a combination of two colors using the conversion table 12 (see FIG. 2).

After conversion, colors corresponding to the gradations of shades of color are assigned to the partial areas C1 and C2 of the color area C. As previously mentioned, for example, in a case where gradations of shades of color are 27, the partial area C1 is "blue", and the C2 is "red".

Similarly, also with respect to colors, M and Y, of one pixel, colors corresponding to gradations of shades of colors are assigned to the color areas M and Y.

One pixel of the original image data is converted, by the above-described processing, into the two-dimensional color code from the gradations of shades of colors CMY.

After this, synchronous timing data is added to the two-dimensional color code by the synchronous timing producing section 13 (SP 33).

The synchronous timing data is added in black to a timing area BK portion provided in a portion after the color area CMY of the two-dimensional color code of one pixel.

The two-dimensional color code after added is stored in the coded memory.

Thereafter, the CMY image memory address and the coded memory address are made incremental.

After this, judgement is made whether or not the CMY image memory address reached a final address (SP 35). When not reached, the processes after SP 31 are continued.

Thereby, the original image data in the entire area of the original image object 20 is converted into the two-dimensional color codes.

Figure 10:
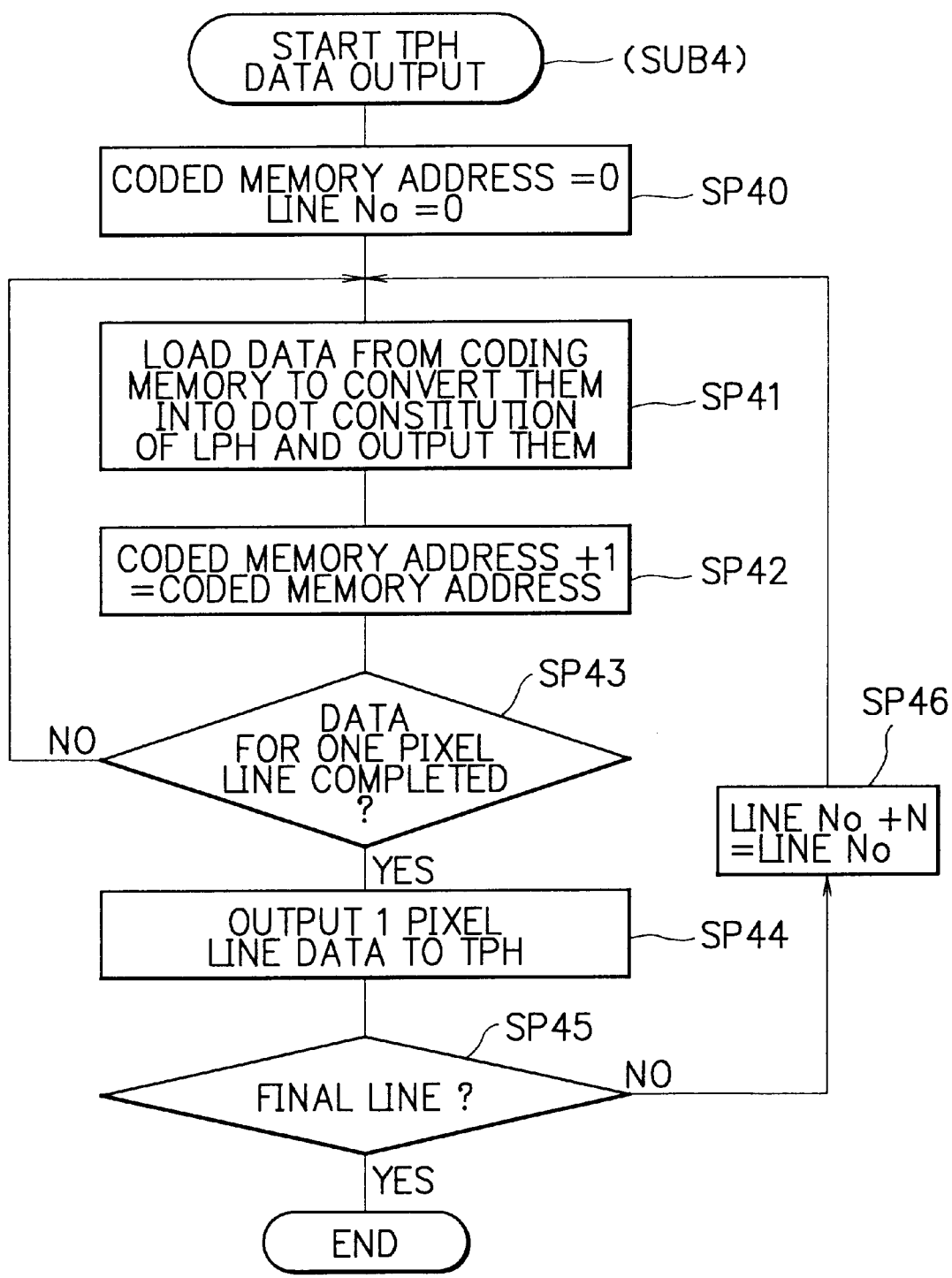
FIG. 10 is a flowchart showing the data output process in the data output section.

FIG. 10 is a flowchart of a subroutine (SUB 4) showing the data output processing of the data output section 15.

With respect to the printing section 4 where output has done, a description will be here made, as an example, a color printer of TPH type for the printing and scanning by N pixel line.

The data output section 15 sets a coded memory address to an initial value (0) at the start of code conversion, and sets pixel line No to an initial value (0) (SP 40).

Next, a two-dimensional color code is read from the coded memory.

A two-dimensional color code corresponding to the entire original image object is developed in the coded memory. Further, a dot constitution when printing is predetermined in the printing section 4.

For example, when one pixel is printed with lateral 8 dots×longitudinal 6 dots shown in FIG. 5B, the two-dimensional color code developed in the coded memory is placed in conformity with the dot constitution.

By the conformity, the color area CMY of colors and the timing area BK are set to lateral 2 dots×longitudinal 6 dots. Further, the color area CMY is set to the partial areas C1, C2 to Y1, Y2 divided by the lateral 2 dots×longitudinal 3 dots.

Then, the data output section 15 outputs the two-dimensional color code with the dot constitution set to a serial memory in the data output section 15 by one pixel (SP 41).

Thereafter, the coded memory address is made incremental (SP 42).

Then, judgment is made whether or not the serial memory address reached an address of one pixel line termination (SP 43). When not reached, the processes after SP 41 are continued.

Next, the two-dimensional color code stored in the N pixel line portion in the serial memory is output to the printing section 4 (SP 43).

When the printing sheet 25 has the size as shown in FIG. 5A, the printing section 4 prints 150 pixels in the printing and scanning of N pixel line. In this case, the data output section 15 outputs the 150 pixels as the N pixel line to the printing section 4.

It is noted that the serial memory outputs data for previous N pixel line portion (two-dimensional color code) when next data for N pixel line portion is input.

While the two-dimensional color code is output by N pixel line to the printing section 4 as described above, the number of color codes corresponds to the original image objects 20. In the example of FIG. 5, there are 300 pixels longitudinally, i.e., 300 lines.

Thereby, the data output section 15 judges whether or not the final line (the 300th pixel line) is reached (SP 45). When not reached, the line No is made incremental till the final line is reached (SP 46), and the processes after SP 41 are continued.

The two-dimensional color data in the final line is output to the printing section 4, whereby the two-dimensional color codes corresponding to the original image objects 20 are printed on the printing sheet 25.

Figure 11:
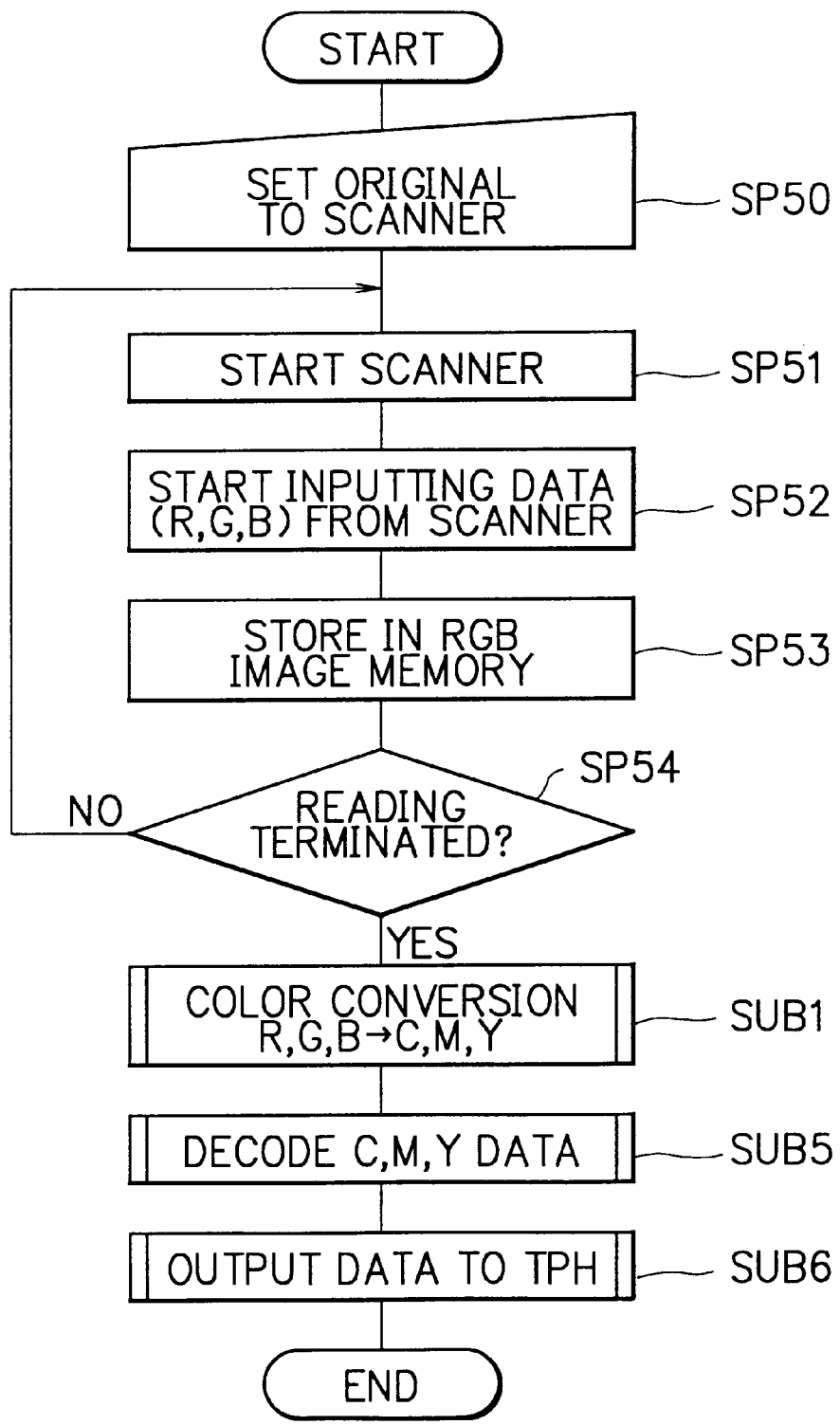
FIG. 11 is a flowchart showing the fundamental operation of the preparation of the restored image data according to the present apparatus.

Next, the operation for obtaining restored image data from the two-dimensional color code prepared will be explained. FIG. 11 is a flowchart showing the fundamental operation relating to the restoration.

The printing sheet 25 is set to the reading surface of the reading section 2 (SP 50), and the reading section 2 is started (SP 51). Then, the reading section 2 line-moves the printing sheet 25 in a main scanning direction to start reading the two-dimensional color code.

The data input section 6 of the processing means 3 inputs the two-dimensional color codes of RGB output from the reading section 2 (SP 52) to store them in the RGB image memory of the memory section 7.

The reading section 2 continuously reads the printing sheet 25 to its final line, and the two-dimensional color code for one surface portion of the printing sheet 25 is stored in the memory section 7 (SP 54).

Next, the color conversion section 8 reads the two-dimensional color codes of RGB stored in the memory section 7 to perform the color conversion from RGB to CMY (SUB 1). The color conversion process is carried out in the process similar to that of reading of the original image object 20 previously mentioned, which explanation will be omitted. The two-dimensional color codes after color conversion are stored in the CMY image memory.

Thereafter, the two-dimensional color codes are converted into the restored image data by the code conversion section 11 (SUB 5).

The converted restored image data is output to the printing section 4, and the printing section 4 prints the restored image objects 30 on the printing sheet 25.

By the above-described operation, it is possible to obtain the restored image object 30 using the printing sheet 25 having the two-dimensional color codes printed thereon.

Next, the aforementioned sub-routines (SUB 5 and SUB 6) will be explained.

Figure 12:
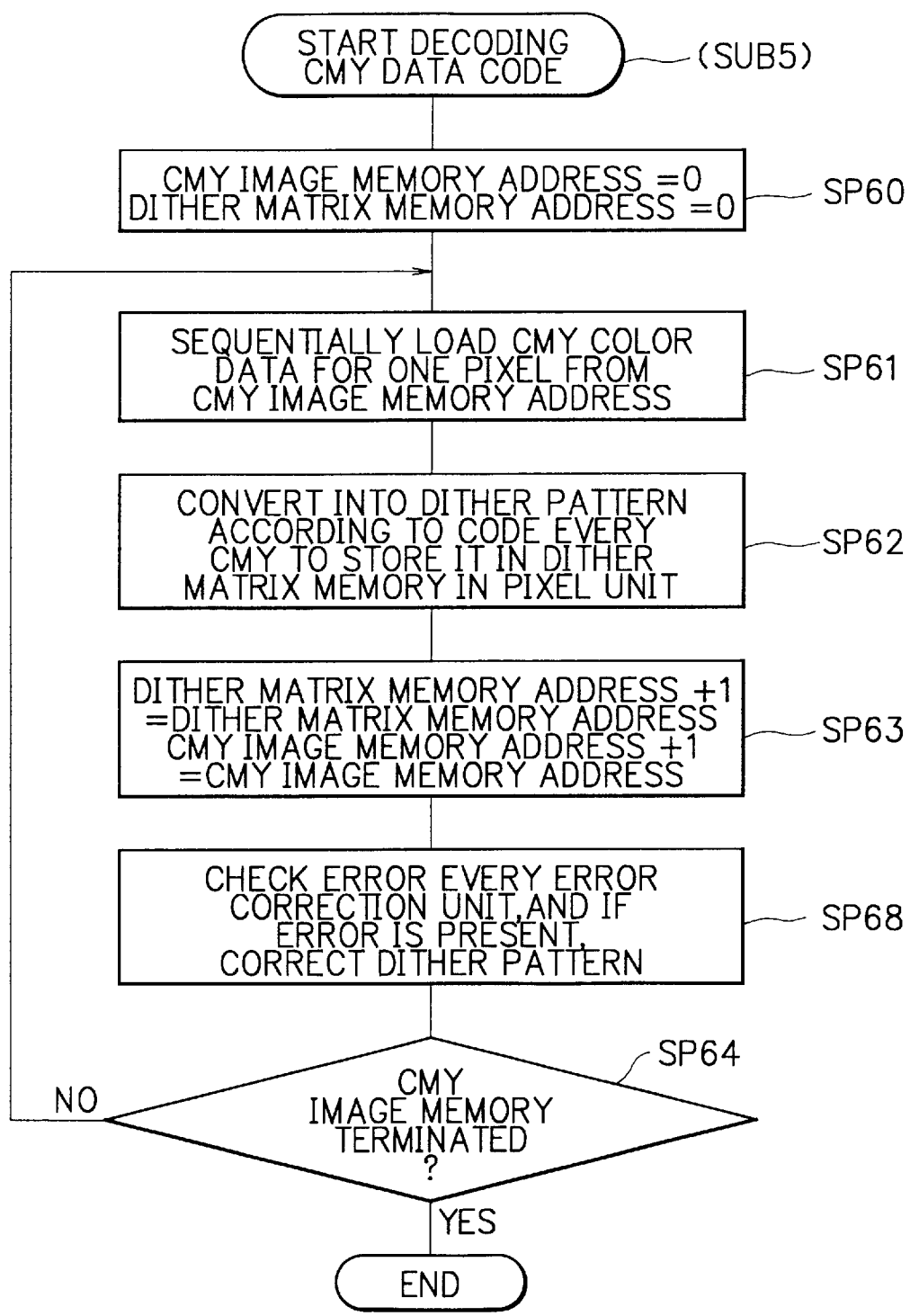
FIG. 12 is a flowchart showing the code conversion process in the code conversion section.

FIG. 12 is a flowchart of the sub-routine (SUB 5) showing the preparing process of restored image data by the code conversion section 11.

The code conversion section 11 sets a CMY memory address and a dither matrix memory address to an initial value (0) (SP 60).

Both the CMY memory address and the dither matrix memory address are formed in a predetermined area of the memory section 7.

Next, the two-dimensional color code for one pixel portion is read from the address designated by the CMY image memory (SP 61). Since one pixel is formed by colors, CMY, they are individually read with respect to C, M, and Y.

The code conversion section 11 first reads colors of the partial areas C1 and C2 of C (cyan color). Then, the reverse conversion process is carried out to obtain gradations of shades of color of the cyan color using the conversion table 12. For example, when the partial area C1 is "blue" and C2 is "red", the shades of color are 27.

Similarly, also with respect to colors, M and Y, of one pixel, they are reversely converted to obtain shades of color using the conversion table 12.

The gradations of shades of CMY colors of one pixel of the restored image data are obtained by the above-described process, which are stored in the dither matrix memory (SP 62).

Thereafter, the CMY image memory address and the dither matrix memory address are made incremental (SP 63).

After this, judgement is made whether or not the CMY image address reached the final address (SP 64). When not reached, the processes after SP 61 are continued.

Thereby, the two-dimensional color codes in the entire area on the printing sheet 25 are converted into the restore image data.

Figure 13:
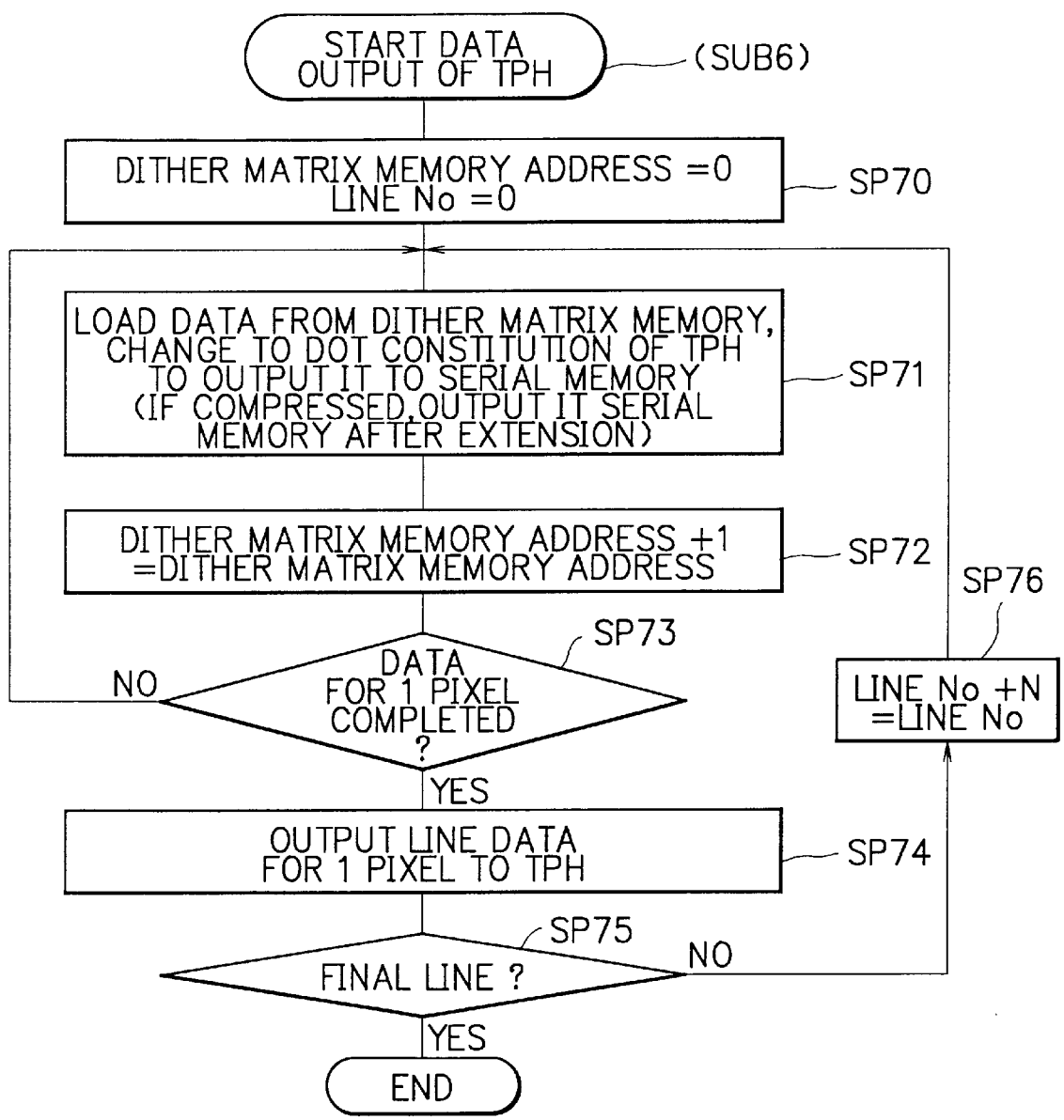
FIG. 13 is a flowchart showing the data output process in the data output section.

FIG. 13 is a flowchart of a sub-routine (SUB 6) showing the data output process in the data output section 15.

The data output section 15 sets a dither matrix memory address to an initial value (0) at the start of code conversion, and sets the line No to an initial value (0) (SP 70).

Next, restored image data is read from the dither matrix memory.

This reading is carried out in conformity with the dot constitution of the printing section 4 (one pixel is printed with lateral 8 dots×longitudinal 6 dots).

The data output section 15 outputs restored image data of one pixel to the area of the dot constitution set. At this time, the restored image data has gradations of shades of color separately of CMY colors. The expression of gradations of colors is carried out by changing the number of dots printed in 48 dots of one pixel according to the gradations of shades of color.

The restored image data is stored one by one pixel in the serial memory in the data output section 15 (SP 71).

Thereafter, the dither matrix memory address is made incremental (SP 72).

Next, judgement is made whether or not the dither matrix memory address reached an address corresponding to the N pixel line of main scanning of the printer 4 (SP 73). When not reached, the processes after SP71 are continued.

Thereafter, the restored image data stored in N pixel line in the serial memory is output to the printing section 4 (SP 74).

Here, the data output section 15 outputs 150 pixels as one pixel line in the main scanning direction, similarly to that previously mentioned. The sub-scanning direction is 300 pixel lines.

The data output section 15 judges whether or not reaching the final line (the 300th pixel line) (SP 75). When not reached, the line No is made incremental till reaching the final line (SP 76), and the processes after SP 71 are continued.

The restored image data in the final line is output to the printing section 4, whereby printing corresponding to the two-dimensional color code is applied onto the restored printed matter.

This restored image object 30 corresponds to a restored object in which original image data of the original image object 20 is restored.

A second embodiment of an apparatus for preparing and restoring a two-dimensional color code according to the present invention will be explained hereinafter.

In this embodiment, the error correcting section 14 is provided at the rear stage of the code conversion section 11 shown in FIG. 3 to carry out the error correcting process.

In the error correcting section 14, a predetermined error correcting symbol is added to a two-dimensional code when a two-dimensional color code is prepared.

When the restored image object 30 is prepared, a restored image data is corrected on the basis of the error correcting symbol.

The adding process of the error correcting symbol when the two-dimensional color code is prepared is shown in a flowchart of FIG. 9.

The error correcting section 14 performs an error correcting computation every two-dimensional color code of a predetermined number of pixels to produce an error correcting symbol.

For example, when two-dimensional color codes for 10 pixel portions are prepared and stored in the coded memory, a predetermined correcting arithmetic calculation is carried out on the basis of two-dimensional color codes for 10 pixel portions to obtain correcting error data.

The error correcting data is converted into an error correcting symbol of a predetermined color corresponding to the data content, and stored in an area of the 11th pixel of the coded memory (SP 38).

An error correcting symbol is added to the error correcting section 14 every time the two-dimensional color codes are prepared for 10 pixel portions.

Thereby, the error correcting symbol for one pixel portion is printed on the printing sheet 25 every 10 pixels.

The error correcting process when the restored image object 30 is prepared is shown by SP 68 in a flowchart of FIG. 12.

The error correcting section 14 performs an error correcting computation on the basis of a two-dimensional color code of a predetermined number of pixels and an error correcting symbol corresponding thereto to judge a reading error.

In a case of the above-described example, the correcting arithmetic calculation is carried out by the two-dimensional color codes for 10 pixel portions to discriminate the coincidence with the error correcting symbol of the 11th pixel.

When coincided, judgement is made that the reading of color of the two-dimensional color code is normally carried out, and the error correction is not carried out. That is, the correcting process with respect to the two-dimensional color code stored in the dither matrix memory is not added.

On the other hand, when is not coincided, judgement made that the reading of color of the two-dimensional color code is not normally carried out, and the error correction is carried out. At this time, the correcting process with respect to the two-dimensional color code stored in the dither matrix memory is added. For example, in a case where the image process in the image processing section 10 performs the dither process, a dither pattern is corrected according to the content of difference.

By adding the error correcting symbol, even if the printing sheet 25 is contaminated, an image of the original image object can be restored using the printing sheet 25 without being affected by the contamination.

A third embodiment of the apparatus for preparing and restoring a two-dimensional color code according to the present invention will be explained hereinafter.

In this embodiment, the arrangement of the synchronous timing data added to the two-dimensional color code previously mentioned is changed.

In the aforementioned embodiment, the timing area BK is provided at the end of the two-dimensional color code of one pixel prepared corresponding to one pixel of the original image data. However, in this embodiment, the timing area BX is not provided every pixel, but the color code is provided separately from the synchronous timing area. Thereby, the color codes are continuously formed in the main scanning direction.

FIG. 14A is a view showing the printing sheet 25 having the two-dimensional color code according to this embodiment.

Color codes are printed per block unit (1 to n) on the printing sheet 25. However, color codes corresponding to the original image data are two dimensionally arranged by the whole blocks 1 to n on the printing sheet 25.

FIG. 14B shows the constitution of 1 block and FIG. 14C is an enlarged view of the block. Each block is composed of lateral 401 pixels×longitudinal 41 pixels.

As shown in FIG. 14D, one pixel is composed of lateral 3 dots×longitudinal 3 dots.

Color areas of C (cyan), M (magenta) and Y (yellow) are set one by one pixel in order of the main scanning direction (in this example, the code area is 398 pixels).

The original image data for one pixel portion of the original image object 20 is coded into gradations of shades of color separately of colors CMY by the code conversion section 11.

In this embodiment, the coding of gradations of shades of color of cyan (C) is carried out merely referring to the table corresponding to one partial area C1 of the code conversion table 12.

That is, in this embodiment, there is not present the aforementioned partial area C2, and only a single color area C is used. Therefore, cyan color of the original image data of one pixel is coded by seven gradations (7 colors).

M and Y are also likewise coded by seven gradations.

At the edge of each block is frame-formed a synchronous timing data BD one by one pixel.

Synchronous timing data BD5 is provided in a main scanning direction in a longitudinal intermediate position (21st pixel) of 1 block.

The synchronous timing data BD5 is provided at interval of one pixel.

These synchronous timing data BD is provided in the aforementioned arrangement in the color codes developed in coded memory by the synchronous timing producing section 13. For these synchronous timing data BD, black not used in the color code is used similarly to the aforementioned embodiment.

The preparation of restored image data using the printing sheet 25 having the two-dimensional color code printed will be explained below.

The reading section 2 uses a scanner which reads the whole area of 1 block (lateral 401 pixels×longitudinal 41 pixels) in one scan. That is, there is used a serial scanner for simultaneously reading longitudinal 41 pixels and scanning them in a lateral direction.

When reading by the reading section 2, the synchronizing section 2a obtains the synchronism of the start of block by the synchronous timing data BD1, and simultaneously obtains the longitudinal (sub-scanning) range of block by the synchronous timing data BD2, 3.

Subsequently, color codes of CMY are read in a (lateral) main scanning direction.

At this time, since the block is provided with synchronous timing data BD5 at interval of one pixel in the main scanning direction, the synchronous section 2a can obtain the synchronism every time the synchronous timing data BD5 is read.

Further, the end position of the main scanning can be again obtained by the synchronous timing data BD4.

Thereby, the reading of the color codes in the block can be carried out accurately.

While in this embodiment, the color area CMY of one pixel of the original image data are provided with one pixel without dividing them, it is to be noted that they can be vertically divided into two parts by predetermined dot number (for example, the color area CMY comprises the partial areas C1, C2 to Y1, Y2).

Figure 15A:
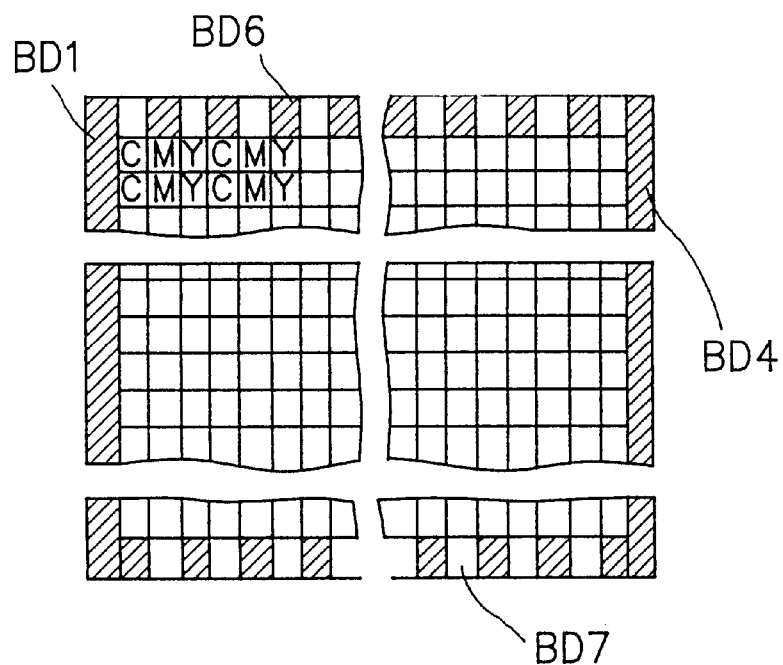
FIG. 15A is a view showing one block of the two-dimensional color code, and FIG. 15B being an enlarged view of the one block.
Figure 15B:
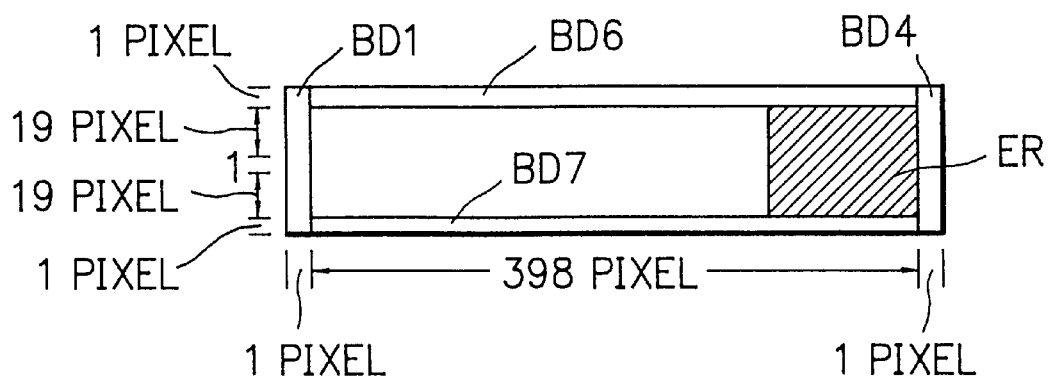

FIGS. 15A and 15B show a modified example of the above-described constitution.

As shown in FIG. 15A, synchronous timing data BD6, 7 provided vertically of 1 block is provided at interval of one pixel in the main scanning direction. The upper synchronous timing data BD6 and the lower synchronous timing data BD7 are alternately arranged in the main scanning direction.

The longitudinal (sub-scanning)range of the block can be obtained by the synchronous timing data BD6, 7, and simultaneously, the synchronism can be obtained every time the synchronous timing data BD6, 7 is read.

In the synchronous timing data BD6, 7, black pixel portions are alternately arranged, and when the original image object 20 (printing sheet) having the original image data printed thereon is oblique with respect to the reading section 2, it is possible to calculate an oblique degree from either relative position in the sub-scanning direction, thus correcting the obliqueness.

FIG. 15B is a view showing a storage area of data for error correcting prepared by the error correction section 14.

As shown, in the rear stage of the color area in 1 block (the rear stage in the main scanning direction of each 1 line) is stored data for correcting error prepared in the color area of the 1 line.

In the illustrated example, about ¼ behind 1 block comprises a storage area ER of error correcting code.

The error correcting section 14 prepares one error correcting symbol every time 10 pixel portions of two-dimensional color codes are prepared, storing them in order of the first pixel of the error correcting area ER.

In the error correcting process at the preparation of the restored image object 30, error correcting computation is carried out on the basis of two-dimensional color codes of a predetermined number of pixels and error correcting codes read from the error correcting area ER corresponding thereto to judge a reading error.

In a case of the aforementioned embodiment, the aforementioned correcting arithmetic calculation is accomplished by two-dimensional color codes for 10 pixel portions at first of the color area to discriminate the coincidence with the error correcting symbol of the first pixel in the error correcting area, and the error correcting process is executed similarly to the above.

A fourth embodiment of an apparatus for preparing and restoring a two-dimensional color code according to the present invention will be explained below.

Input data of a predetermined bit is continuously input into the data input section 6 of the processing means 3 shown in FIG. 3. FIG. 16A is a view showing this input data.

For example, this input data comprises image data of colors CYM, and gradations of shades of color of colors CMY are continuously input every second with 5 bits (resolution of 32 gradations).

As shown in FIG. 16B, the data input section 6 of the processing means 3 outputs input data of 5 bits 3 by 3 bits to the code conversion section 11.

The data of 3 bits is equivalent to data of 1 bit (1 pixel) corresponding to each colors of CMY.

As shown in FIG. 16C, the input data 3 by 3 bits is output to the conversion section 11 and converted into color codes using the conversion table 12. For the color codes, the aforementioned 7 colors are used.

The operation of the above-described constitution will be explained. The leading input data of 5 bits is divided into 3 bits by the data input section 6. In the code conversion section 11, a corresponding "yellow" color code is obtained referring to only the partial area C1 in the conversion table 12 (described in FIG. 2) on the basis of data "101" of the leading 3 bits.

Next input data of 3 bits is "101", thereby obtaining "green" color code.

Even in a case where input data is continuously input as described above, the input data is divided into 3 bits irrespective of the number of bits of the input data and converted into color codes whereby the color codes can be printed on the printing sheet 25 similarly to the above-described embodiment.

In the printing section 4, after 1 line of color codes has been formed by the main scanning, the sub-scanning is executed whereby two-dimensional color codes are printed on the printing sheet 25.

The printing sheet 25 having the two dimensional color codes printed thereon is subjected to the restoring process similarly to the aforementioned embodiment by the reading and processing means in the reading section 2 so as to obtain restored data in which input data is restored.

While in the above-described example, the constitution is employed in which only expressive power of 2 gradations is provided with respect to three original colors of cyan, magenta and yellow so as not to produce a reading error in color codes, it is to be noted that color codes can be expressed with colors of multigradation according to the accuracy of a scanner or the like. For example, when expressive power of four gradations of colors is provided, the number of bits for dividing input data will be 6 bits.

A fifth embodiment of an apparatus for preparing and restoring a two-dimensional color code according to the present invention will be explained below.

While in the respective above-described embodiments, a description has been made to prepare two-dimensional color codes for the purpose of preserving end restoring an image, it is to be noted that the object of the preservation and restoration is not limited to the image.

In this embodiment, an example will be explained in which a two-dimensional color code is used for the preservation and restoration of voices.

First, the preparation of a two-dimensional color code based on original voice data will be explained.

Original voice data is input into the data input section 6 of the processing means 3 shown in FIG. 3.

The input section 6 is provided with a microphone input section and a line input section, into which are input various voice sources.

Further, the data input section 6 has an A/D conversion section which converts an analog input into a digital input.

FIG. 17 is a flowchart for the preparation of a two-dimensional color code on the basis of voice data according to the present embodiment.

The data input section 6 is capable of setting a plurality of sampling frequencies in advance by voice source input. The original voice data is subjected to sampling at the rate according to the sampling frequencies (SP 80), the sampling data being sequentially stored in the voice memory area of the memory section 7 (SP 81).

An input period of the original voice data is set to a period on the basis of the sampling frequencies and the size of the printing sheet 25 (SP 82).

The color conversion section 8 and the image processing section 10 are operated.

The code conversion section 11 converts the sampling data input into a two-dimensional color code referring to the conversion table 12.

The conversion table 12 designates a combination of colors of 48 gradations on the basis of data value of the sampling data, as shown in FIG. 2.

Thereby, each sampling data is converted into a combination of colors of partial areas C1, C2 (cyan color) obtained by dividing one pixel into two parts.

The two-dimensional color code after conversion is stored in the coded memory area of the memory section 7 (SP 83).

The error correcting section 14 adds an error correcting symbol every predetermined number of two-dimensional color codes to add it to the coded memory area.

The data processing section 15 adapts this two-dimensional color code to the dot constitution of the printing section 4 to output it (SP 84).

The printing section 4 prints the two-dimensional color code on the printing sheet 25 having a predetermined size.

The original voice data for a predetermined time can be printed and stored as the two-dimensional color code on the printing sheet 25 by the aforementioned constitution and operation.

The printing sheet 25 having the two-dimensional color code printed thereon may be constituted by cardboard to provide a rigidity.

The preparation of restored voice data using the printing sheet 25 will be explained below.

FIG. 18 is a flowchart for the preparation of restored voice data on the basis of the two-dimensional color code.

First, the printing sheet 25 having the two-dimensional color code printed thereon is set to the reading section 2 and read by the reading section 2 (SP 90). This reading is continued till the entire printing sheet 25 is read (SP 91).

The two-dimensional color code is input in RGB by N pixel line by N pixel line into the data input section 6, and color conversion from RGB to CMY is made by the color conversion section 8.

After a predetermined image processing has been applied in the image processing section 10, it is converted into a corresponding data value pixel by pixel by the code conversion section 11 (SP 92). At this time, the conversion table 12 can be used with reverse conversion.

The data value obtained by a plurality of pixels is corrected in error by the error correcting section 14, and after this, is converted into a corresponding analog signal by the data output section 15, which analog signal is output outside as restored voice data (SP 93).

The restored voice data is output by an amplifier and a speaker.

As explained in the present embodiment, the apparatus 1 for preparing and restoring the two-dimensional color code according to the present invention can handle coding objects such as image data as well as voice data.

The present invention has the effects as follows:

According to the two-dimensional color code of the present invention, it is possible to prepare or restore bar codes which are two-dimensional and use colors so that many information can be coded as compared with conventional two-dimensional codes.

Thereby, according to this two-dimensional color code, it is possible to print and preserve a large capacity of data without increasing the size of a printing sheet to be printed.

Each color area is constituted by partial areas further divided into two parts, and colors are combined by the partial areas whereby a large capacity of data can be coded.

While in the above-described embodiments, a printing sheet has been used as a recording medium, it is to be noted that its material is not limited to paper but known materials capable of forming an image such as plastic sheets, resin films or clothes may be used. Further, with respect to the recording section, a description has been made for an example of a printing section using a thermal head system, it is to be noted that the recording section is not limited thereto but known recording systems such as an ink jet or other known recording techniques may be employed.

According to the method and apparatus of the present invention, the gradations of shades of colors of cyan, magenta and yellow of the original image data of one pixel of the original image object are read, the codes of colors corresponding to the gradations of shades of color are arranged in three colors areas by colors provided in one pixel, and printing is done on a printing sheet in the printing section. Therefore, in a case of scores of gradations, it is possible to print and store original image data of the entire original image object as two-dimensional color codes on the printing sheet having the same size as the original image object.

Since the image content of the original image object can be stored in the printing sheet, even if the original image object becomes contaminated, it is possible to obtain a restored original image object corresponding to the original image object using the printing sheet.

Further, since the image content of the original image object is replaced by the two-dimensional color data, it is possible to provide a state in which the image content of the original image object cannot tell merely by seeing the printing sheet, and it can be used to keep a secret of the original image object.

Furthermore, if the constitution is provided in which data input is divided 3 by 3 bits corresponding to the three color areas, the input data can be continuously input. It is possible to prepare two-dimensional color codes on the basis of various data such as voice data.

The restoring apparatus is possible to obtain restored image data and restored voice data merely by performing the process reverse to the process in which the two-dimensional color code is prepared by the preparing apparatus. Therefore, these preparing apparatus and restoring apparatus can be used in common by one and the same apparatus.

The two-dimensional color code printed on the printing sheet as described above is provided with synchronous timing data or error correcting code whereby reading by the reading section can be done accurately and stably.

Moreover, when the relation between the data content of input data and the color code is stored in advance in the conversion table, it is possible to prepare the color code merely by referring to the conversion table by the code conversion section.

When the input data is the image data, the conversion table designates color codes on the basis of the gradations of shades of colors, cyan, magenta and yellow input to prepare two-dimensional color codes. When restored image data is obtained from the two-dimensional color code, the gradations of shades of colors can be easily obtained by the reverse conversion.

Similarly, even if the input data is the voice data, the conversion table of the type corresponding to the data value after sampling is merely provided whereby the preparation of two-dimensional color code and the preparation of restored voice data on the basis of two-dimensional color code can be easily carried out.

What is claimed is:

1. A two-dimensional color code comprising,
    color areas in which data is expressed by color codes corresponding to said data, a plurality of said color areas being arranged two-dimensionally in longitudinal and lateral directions corresponding to the plurality of data, and
    synchronous timing data which is a reference for synchronism when the two-dimensional color code is read, said synchronous timing data being formed from color not used as codes expressing said color areas.

2. A two-dimensional color code according to claim 1, wherein said synchronous timing data is provided every two-dimensional color code to recognize division of the two-dimensional color codes.

3. A two-dimensional color code in which one pixel data is color-coded in three color areas corresponding to three primary colors, cyan, magenta and yellow,
    each of said color areas is constituted by a plurality of divided partial areas, and one color out of a plurality of colors obtained by a combination of said three primary colors is arranged in each partial area, and
    said one pixel data is expressed by a combination of colors arranged in said partial area and a combination of three color areas.

4. A method for preparing a two-dimensional color code comprising:
    a first step of inputting original image data of an original image object;
    a second step of calculating gradations of shades of colors of color components when one pixel of the original image data is color-separated by three primary colors, cyan, magenta and yellow;
    a third step of preparing color areas expressing numerical values indicative of gradations of shades of said colors to use an assembly of one pixel portion of the color areas as a color code of the pixel; and
    a fourth step of recording the color code two-dimensionally in longitudinal and lateral directions of a recording medium.

5. A method for restoring a two-dimensional color code for obtaining restored image data on the basis of the two-dimensional color code prepared by the fourth step according to claim 4 comprising:
    a fifth step of reading colors constituting the color areas of the one pixel recorded on the recording medium;
    a sixth step of calculating the gradations of shades of colors in said color areas by a combination of colors constituting said color areas within said color code;
    a seventh step of setting said gradations of shades of colors of said three primary colors in said one pixel on the basis of said gradations of shades of colors calculated separately of said colors to obtain said restored image data; and
    an eighth step of recording said restored image data on the recording medium to obtain a restored image object.

6. A method for preparing a two-dimensional color code comprising:
- a first step of continuously inputting input data having predetermined bits;
- a second step of dividing the input data continuously input 3-bit by 3-bit;
- a third step of color-coding said input data of 3-bit divided as described into one pixel using one color out of a plurality of colors obtained by a combination of three primary colors;
- a fourth step of two-dimensionally arranging a plurality of color codes of said one pixel corresponding to the input data continuously input; and
- a fifth step of recording the thus arranged two-dimensional color code in a recording medium.

7. A method for restoring a two-dimensional color code for obtaining restored data on the basis of the two-dimensional color code prepared by the fifth step according to claim 6 comprising:
- a sixth step of sequentially reading said two-dimensional color codes recorded in said recording medium;
- a seventh step of converting each color code into restored data of a plurality of bits on the basis of color thereof; and
- an eighth step of sequentially outputting said restored data of a plurality of bits sequentially read.

8. An apparatus for preparing a two-dimensional color code comprising:
- a recording section for performing recording by using three primary colors, cyan, magenta and yellow; and
- processing means for converting input data into a color code to output it to said recording section;
- said processing means having a code conversion section for dividing pixels of said input data into three color areas corresponding to said three primary colors, cyan, magenta and yellow to color-code them;
- said code conversion section setting colors obtained by a combination of said three primary colors in said color areas corresponding to contents of said input data whereby said input data is are color-coded by a combination of the three color areas, which is then two-dimensionally arranged corresponding to the plurality of input data to output them to the recording section.

9. An apparatus for preparing a two-dimensional color code, comprising:
- a reading section for reading and outputting original image data on an original image object;
- means for calculating gradations of shades of colors of cyan, magenta and yellow occupied by one pixel of said original image data;
- color code preparation means for preparing color areas expressing numerical values indicative of gradations of shades of said colors by a combination of corresponding colors and using an assembly of one pixel portion of said color areas as color codes of said pixel; and
- a recording section for recording the color codes prepared by said color code preparation means two-dimensionally in longitudinal and lateral directions of a recording medium.

10. An apparatus for restoring a two-dimensional color code for obtaining restored image data on the basis of the two-dimensional color codes prepared by the apparatus according claim 9, comprising:
- a reading section for reading colors constituting the color areas of said one pixel recorded in said recording medium;
- means for calculating said gradations of shades of colors in said colors areas by a combination of colors constituting said color areas in said color codes;
- means for setting said gradations of shades of colors of said three primary colors in said one pixel on the basis of said gradations of shades of color calculated separately of said colors; and
- a recording section for recording said restored image data in the recording medium to obtain a restored image object.

11. An apparatus for preparing and restoring a two-dimensional color code comprising:
- an apparatus for preparing a two-dimensional color code including a reading section for reading and outputting original image data on an original image object; means for calculating gradations of shades of colors of cyan, magenta and yellow occupied by one pixel of said original image data; color code preparation means for preparing color areas expressing numerical values indicative of gradations of shades of said colors by a combination of corresponding colors and using an assembly of one pixel portion of said color areas as color codes of said pixel; and a recording section for recording the color codes prepared by said code preparation means two-dimensionally in longitudinal and lateral directions of a recording medium, and
- an apparatus for restoring a two-dimensional color code including a reading section for reading colors constituting the color areas of said one pixel recorded in said recording medium; means for calculating said gradations of shades of colors in said color areas by a combination of colors constituting said color areas in said color codes; means for setting said gradations of shades of colors of said three primary colors in said one pixel on the basis of said gradations of shades of colors calculated separately of said colors; and a recording section for recording said restored image data in the recording medium to obtain a restored image object.

12. An apparatus for preparing and restoring a two dimensional color code in which color areas expressing input data by colors corresponding to the input data are arranged two-dimensionally, comprising:
- a recording section for recording in a recording medium by using three primary colors, cyan, magenta and yellow;
- a reading section for reading said three primary colors, cyan, magenta and yellow recorded in the recording medium;
- processing means in which when said two dimensional color code is prepared, three color areas corresponding to the three primary colors, cyan, magenta and yellow, of the input data are divided and set, and colors obtained by a combination of said three primary colors are arranged in said color areas corresponding to contents of said input data whereby said input data is color-coded by the combination of the three color areas to prepare two-dimensional color codes to output them to the recording section; and when said input data on the basis of the two-dimensional color codes is restored, the contents of the data are restored on the basis of the combination of the three color areas read by said reading section to output them; and
- a synchronous timing producing section in which one color except colors used for said two-dimensional color codes is preset, and when said two-dimensional color code is prepared, synchronous timing data is arranged, said reading section being provided with a synchronous section for taking a synchronism on the basis of said synchronous timing data provided in said two-dimensional color codes.

13. An apparatus for preparing and restoring a two-dimensional color code according to claim 12, wherein in the synchronous timing producing section, said synchronous timing data is provided every two-dimensional color code to recognize division of the two-dimensional color codes.

14. An apparatus for preparing and restoring a two dimensional color code in which color areas expressing in put data by colors corresponding to the input data are arranged two-dimensionally, comprising:

a recording section for recording in a recording medium by using three primary colors, cyan, magenta and yellow;

a reading section for reading said three primary colors, cyan, magenta and yellow recorded in the recording medium;

processing means in which when said two dimensional color code is prepared, three color areas corresponding to the three primary colors, cyan, magenta and yellow, of the input data are divided and set, and colors obtained by a combination of said three primary colors are arranged in said color areas corresponding to contents of said input data whereby said input data is color-coded by the combination of the three color areas to prepare two-dimensional color codes to output them to the recording section; and when said input data on the basis of the two-dimensional color codes is restored, the contents of data are restored on the basis of the combination of the three color areas read by said reading section to output them; and a synchronous timing producing section in which one color except colors used for said two-dimensional color codes is preset, and synchronous timing data is arranged every two-dimensional color code of a predetermined number of pixels, said reading section being provided with a synchronous section for taking a synchronism on the basis of the synchronous timing data recorded every predetermined number of pixels when said two-dimensional color code is read.

15. An apparatus for preparing and restoring a two dimensional color code in which color areas expressing input data by colors corresponding to the input data are arranged two-dimensionally, comprising:

a recording section for recording in a recording medium by using three primary colors, cyan, magenta and yellow;

a reading section for reading said three primary colors, cyan, magenta and yellow recorded in the recording medium;

processing means in which when said two dimensional color code is prepared, three color areas corresponding to the three primary colors, cyan, magenta and yellow, of the input data are divided and set, and colors obtained by a combination of said three primary colors are arranged in said color areas corresponding to contents of said input data whereby said input data is color-coded by the combination of the three color areas to prepare two-dimensional color codes to output them to the recording section; when said input data on the basis of the two-dimensional color codes is restored, the contents of data are restored on the basis of the combination of the three color areas read by said reading section to output them; and when said two-dimensional color code is prepared, error correcting computation on the basis of the two-dimensional color code of a predetermined number of pixels is performed every preparation of the two-dimensional color code of a predetermined number of pixels, and an error correcting code corresponding to the results of computation is arranged, and an error correcting section in which when said two-dimensional color code is read, an error correcting computation on the basis of the two-dimensional color code of a predetermined number of pixels read is performed, and judgement is made whether or not a result of the computation coincides with said error correcting code, and when not coincided, corresponding error processing is performed.

16. An apparatus for preparing a two-dimensional color code, comprising:

a reading section for reading and outputting gradations of shades of color of RGB components occupied by one pixel of original image data on an original image object;

a color coordinate conversion section for color-coordinate converting said gradations of shades of color in a RGB color coordinate system output from said reading section into a color coordinate system of cyan, magenta and yellow (CMY);

a conversion table in which color codes corresponding to gradations of shades of color separately of CMY colors are stored in advance;

a code conversion section for converting said gradations of shades of color into corresponding color codes referring to said conversion table to arrange them in color areas separately of CMY colors; and a recording section for two-dimensionally arranging the color codes arranged in the color areas to record them in a recording medium.

17. An apparatus for preparing a two-dimensional color code according to claim 16, wherein plural colors of color codes obtained by a combination of the three primary colors, CMY, are stored in said conversion table in the form of a combination of two longitudinal and lateral rows, and said code conversion section is arranged with two color codes output from said conversion table divided into two within the corresponding color areas.

18. An apparatus for restoring a two-dimensional color code recorded by an apparatus according to claim 16 of the two-dimensional color code, wherein sections when the apparatus is used for restoration operate as follows:

said reading section reads colors in the color areas by the RGB coordinate system to output them;

said conversion table obtains gradations of shades of color separately of CMY colors on the basis of color data of said color areas;

said code conversion section refers to said conversion table to output gradations of shades of color separately of CMY colors corresponding to the two-dimensional color codes; and said recording section records said restored image data in the recording medium on the basis of gradations of shades of color separately of CMY colors.

19. An apparatus for preparing a two-dimensional color code, comprising:

processing means for dividing input data having predetermined bits continuously input by plural bits, sequentially color-coding the thus divided input data of plural bits pixel by pixel using one color out of plural colors obtained by a combination of the three primary colors to two-dimensionally arrange a plurality of pixels; and a recording section for recording the two-dimensional color codes of a row of pixels arranged by said processing means in the recording medium.

20. An apparatus for restoring a two-dimensional color code for obtaining restored data on the basis of the two-dimensional color codes prepared by the preparation apparatus according to claim 19, comprising:

a reading section for sequentially reading said two-dimensional color codes recorded in said recording medium; and processing means for sequentially converting colors of said color codes read by said reading section into corresponding restored data of plural bits obtained by a combination of the three primary colors to continuously output them in order of conversion.

21. An apparatus for preparing a two-dimensional color code, comprising:

a data input section for sampling voice data input at a predetermined sampling frequency;

a conversion table in which color codes corresponding to data values of sampling data are stored in advance;

a code conversion section for converting said sampling data into corresponding color codes referring to said conversion table;

a synchronous timing producing section in which one color except colors used for the two-dimensional color codes is preset, and when the two-dimensional color code is prepared, synchronous timing data is arranged; and a recording section for recording said color codes arranged in the color areas in a recording medium.

22. An apparatus for restoring a two-dimensional color code, comprising:

the apparatus for preparing a two-dimensional color code according to claim 21 to obtain restored voice data on the basis of the two-dimensional color codes;

a reading section having a synchronous section for taking a synchronism on the basis of said synchronous timing data provided in the two-dimensional color codes, said reading section reading the thus prepared two-dimensional color codes by an RGB coordinate system to output them; and a color conversion section for converting data of the two-dimensional color codes output from said reading section into a color coordinate system of cyan, magenta and yellow, said code conversion section outputting sampling data corresponding to the two-dimensional color codes referring to said conversion table.

* * * * *